(12) United States Patent
Chijioke et al.

(10) Patent No.: US 10,641,663 B2
(45) Date of Patent: May 5, 2020

(54) DYNAMIC FORCE CONTACTOR, PROVIDING A DYNAMIC FORCE, AND CALIBRATING A FORCE SENSOR TO BE TRACEABLE TO THE INTERNATIONAL SYSTEM OF UNITS

(71) Applicant: Government of the United States of America, as represented by the Secretary of Commerce, Gaithersburg, MD (US)

(72) Inventors: Akobuije D Chijioke, Silver Spring, MD (US); Nicholas Vlajic, Frederick, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 20 days.

(21) Appl. No.: 16/130,471

(22) Filed: Sep. 13, 2018

(65) Prior Publication Data

US 2019/0078945 A1    Mar. 14, 2019

Related U.S. Application Data

(60) Provisional application No. 62/558,101, filed on Sep. 13, 2017.

(51) Int. Cl.
| | |
|---|---|
| *G01L 1/00* | (2006.01) |
| *G01L 1/12* | (2006.01) |
| *H01F 7/121* | (2006.01) |
| *H01F 7/08* | (2006.01) |
| *H01F 7/06* | (2006.01) |

(Continued)

(52) U.S. Cl.
CPC ............. *G01L 1/122* (2013.01); *H01F 7/064* (2013.01); *H01F 7/066* (2013.01); *H01F 7/081* (2013.01);

(Continued)

(58) Field of Classification Search
CPC ......... G01L 1/122; H01F 7/066; H01F 7/081; H01F 7/121; H01F 7/122; H01F 7/1844

(Continued)

(56) References Cited

U.S. PATENT DOCUMENTS

| | | | | |
|---|---|---|---|---|
| 4,500,827 A | * | 2/1985 | Merritt ................... | H02K 35/04 290/1 R |
| 5,587,618 A | * | 12/1996 | Hathaway ............... | H02K 31/02 310/102 A |

(Continued)

OTHER PUBLICATIONS

Chijioke, R.L., et al., NIST 1-kilonewton sine force calibration system, IMEKO International Conferences, 2014.

(Continued)

*Primary Examiner* — Max H Noori
(74) *Attorney, Agent, or Firm* — Office of Chief Counsel for National Institute of Standards and Technology

(57) ABSTRACT

A dynamic force contactor includes: a magnet that provides a magnetic field; an electrical conductor that provides an electric field perpendicular to the magnetic field, the electric field from the electrical conductor in combination with the magnetic field from the magnet providing a Lorentzian force; an armature disposed proximate to the magnet, the electrical conductor disposed on the armature such that the armature reciprocates in a reciprocating direction relative to the magnet in response to the Lorentzian force and that produces the dynamic force; and a dynamic force mediator in communication with the electrical conductor and the armature such that: the dynamic force mediator monitors an alternating voltage across the electrical conductor; the dynamic force mediator monitors an alternating current through the electrical conductor; and the dynamic force mediator monitors a reciprocation velocity of the armature.

16 Claims, 22 Drawing Sheets

(51) Int. Cl.
H01F 7/18 (2006.01)
H01F 7/122 (2006.01)
(52) U.S. Cl.
CPC ............ *H01F 7/121* (2013.01); *H01F 7/122* (2013.01); *H01F 7/1844* (2013.01)
(58) Field of Classification Search
USPC .......................................................... 73/779
See application file for complete search history.

(56) References Cited

U.S. PATENT DOCUMENTS

| 6,645,108 | B1 * | 11/2003 | Gradu | B60K 17/3462 |
| | | | | 180/249 |
| 8,182,433 | B2 * | 5/2012 | Leo | A61B 90/06 |
| | | | | 600/587 |
| 2011/0037327 | A1 * | 2/2011 | Denne | H02K 41/03 |
| | | | | 310/12.16 |

OTHER PUBLICATIONS

Fang, H., et al., "A watt balance based on a simultaneous measurement scheme", Metrologia, 2014, S80-S87, 51, IOP Publishing, United Kingdom.

Robinson, I.A., "Simplified fundamental force and mass measurements", Metrologia, 2016, 1054-1060, 53, IOP Publishing, United Kingdom.

Sutton, C.M., "An oscillatory dynamic mode for a watt balance", Metrologia, 2009, 467-472, 46, IOP Publishing, United Kingdom.

* cited by examiner (A)

(B)

DYNAMIC FORCE CONTACTOR, PROVIDING A DYNAMIC FORCE, AND CALIBRATING A FORCE SENSOR TO BE TRACEABLE TO THE INTERNATIONAL SYSTEM OF UNITS

CROSS REFERENCE TO RELATED APPLICATIONS

The application claims priority to U.S. Provisional Patent Application Ser. No. 62/558,101 filed Sep. 13, 2017, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov; reference NIST Docket Number 16-033US1.

BRIEF DESCRIPTION

Disclosed is a dynamic force contactor to provide a dynamic force, the dynamic force contactor comprising: a magnet that provides a magnetic field; an electrical conductor that provides a current perpendicular to the magnetic field, the current in the electrical conductor in combination with the magnetic field from the magnet providing a Lorentzian force; an armature disposed proximate to the magnet, the electrical conductor disposed on the armature such that the armature reciprocates in a reciprocating direction relative to the magnet in response to the Lorentzian force and that produces the dynamic force; and a dynamic force mediator in communication with the electrical conductor and the armature such that: the dynamic force mediator monitors an alternating voltage across the electrical conductor; the dynamic force mediator monitors an alternating current through the electrical conductor; and the dynamic force mediator monitors a reciprocation velocity of the armature.

Disclosed is a process for providing a dynamic force, the process comprising: disposing the armature of the dynamic force contactor in contact with a structure to which the dynamic force is applied; providing electrical power to the electrical conductor, the electrical power comprising a time-varying amplitude; and reciprocating the armature at the reciprocation velocity in response to providing electrical power to the electrical conductor to provide the dynamic force to the structure.

Disclosed is a process for calibrating a force sensor to be traceable to the international system of units (SI), the process comprising: disposing the armature of the dynamic force contactor in contact with a structure to which the force sensor under calibration is disposed; providing electrical power to the electrical conductor, the electrical power comprising a time-varying amplitude; reciprocating the armature at the reciprocation velocity in response to providing electrical power to the electrical conductor; providing the dynamic force to the structure; measuring the alternating voltage; determining the alternating current through the electrical conductor; determining the reciprocation velocity of the armature; determining the dynamic force from the reciprocation velocity, the alternating voltage, and the alternating current; and determining a calibration response for the force sensor to calibrate the force sensor to be traceable to the SI.

BRIEF DESCRIPTION OF THE DRAWINGS

The following description should not be considered limiting in any way. With reference to the accompanying drawings, like elements are numbered alike.

DETAILED DESCRIPTION

A detailed description of one or more embodiments is presented herein by way of exemplification and not limitation.

It has been discovered that a dynamic force contactor can be a portable dynamic force standard that provides a mechanical dynamic force so that the dynamic force applied to a structure can be determined through electrical and mechanical measurements. Advantageously, the dynamic force contactor is a portable apparatus for dynamic force calibration that dynamically calibrates a force sensor in an environmental setting in which the force sensor resides or is applied. The dynamic force contactor overcomes challenges in measuring dynamic force such as a dynamic calibration response of the force sensor that can change and that can depend upon an application setting.

Trade, commerce, and test of materials and engineering structures involve a determination of force in areas such as commercial weight of goods (e.g., produce and raw materials), aerospace structures (e.g., aerodynamic drag forces and reaction forces in landing gear), crash testing of vehicles, machining and manufacturing processes, and the like. The force can be measured with a conventional force sensor that often outputs a voltage that represents an applied force. The output voltage and a sensor calibration response provide a force value for each value of the output voltage of the conventional force sensor to determine the applied force. The dynamic force contactor described herein provides traceability of the calibration response of the conventional force sensor through a measurement of voltage, current, and reciprocation velocity to the International System (SI) of Units.

The dynamic force contactor provides and determination of dynamic force, wherein conventional national and international force calibration procedures that determine the calibration response of conventional force sensor determine static force where the applied force is constant and does not change with time. Unexpectedly, the dynamic force contactor dynamically calibrates the force sensor even when the force changes in time. The dynamic force contactor overcomes problems with calibrating a force sensor dynamically that include a dynamic calibration response of the force sensor that changes depending on the application setting in which the force sensor is used. Moreover, the dynamic force contactor provides accurate dynamic force measurements and calibrates the force sensor for making accurate dynamic force measurements.

Figure 1:
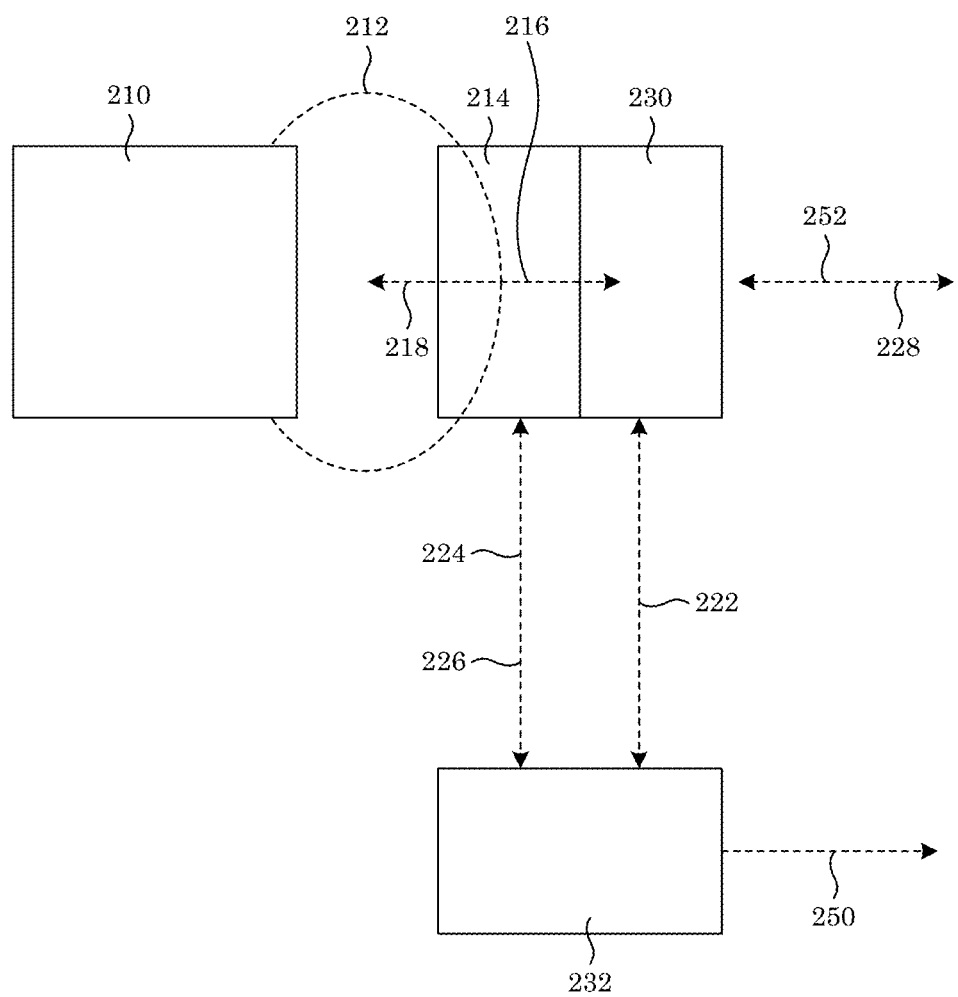
FIG. 1 shows a dynamic force contactor.

Dynamic force contactor 200 provides dynamic force 252. In an embodiment, with reference to FIG. 1, dynamic force contactor 200 includes magnet 210 that provides magnetic field 212; electrical conductor 214 disposed proximate to magnet 210 in magnetic field 212 and that provides alternating current 226 perpendicular to magnetic field 212. Alternating current 226 from electrical conductor 214 in combination with magnetic field 212 from magnet 210 provide Lorentzian force 218. Dynamic force contactor 200 also includes armature 230 disposed proximate to magnet 210 such that electrical conductor 214 is disposed on armature 230, and armature 230 reciprocates in reciprocating direction 228 relative to magnet 210 in response to Lorentzian force 218, wherein armature 230 produces dynamic force 252. In dynamic force contactor 200, dynamic force mediator 232 is in communication with electrical conductor 214 and armature 230 such that dynamic force mediator 232 monitors alternating voltage 224 across electrical conductor 214, alternating current 226 through electrical conductor 214, and reciprocation velocity 222 of armature 230. As used herein, alternating current and alternating voltage refer to a voltage or current that varies with time such that a frequency component for a frequency that can be 5 Hertz (Hz) or greater is present. As used herein, reciprocating refers to a mechanical motion that has a frequency component at a frequency of 5 Hz or greater.

Figure 2:
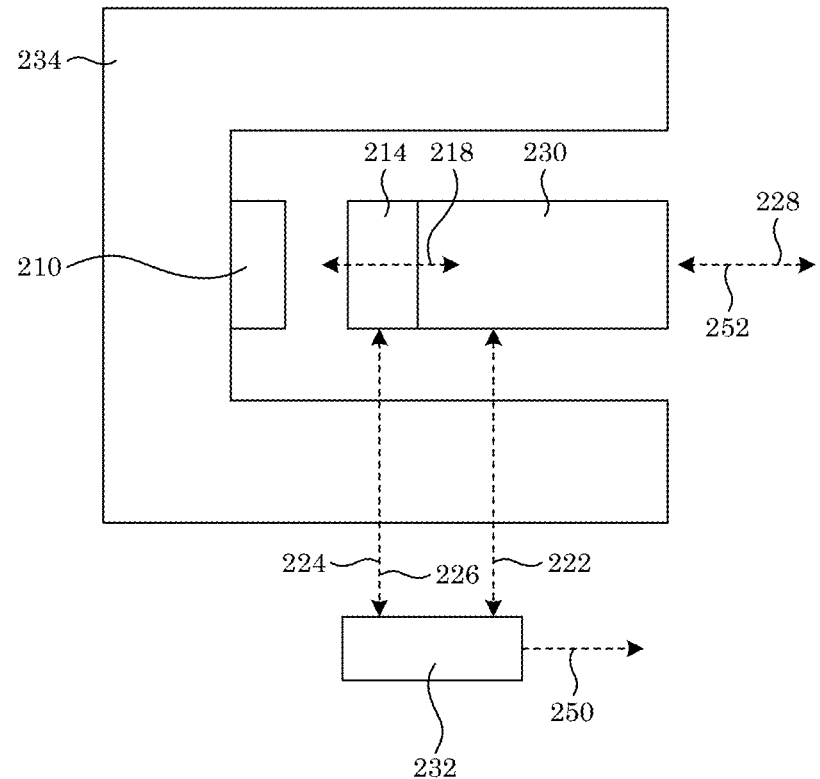
FIG. 2 shows a dynamic force contactor.
Figure 2:
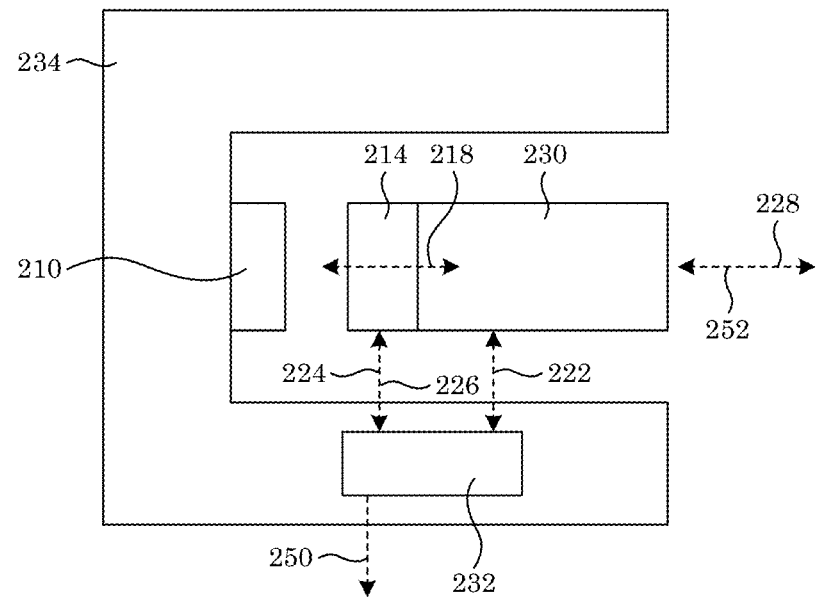

In an embodiment, with reference to FIG. 2, dynamic force contactor 200 includes housing 234 on which features, e.g., magnet 210, electrical conductor 214, armature 230, and dynamic force mediator 232, are disposed. According to an embodiment, dynamic force mediator 232 is in communication with electrical conductor 214 and armature 230 to produce dynamic force signal 250. Here, magnet 210 is rigidly or monolithically attached to housing 234, and electrical conductor 214 and armature 230 are movably disposed on housing 234 to reciprocate in reciprocating direction 228 relative to housing 234. Dynamic force mediator 232 can be disposed on housing 234 as in panel B of FIG. 2 or can be remotely disposed to housing 234, as in panel A of FIG. 2.

Figure 3:
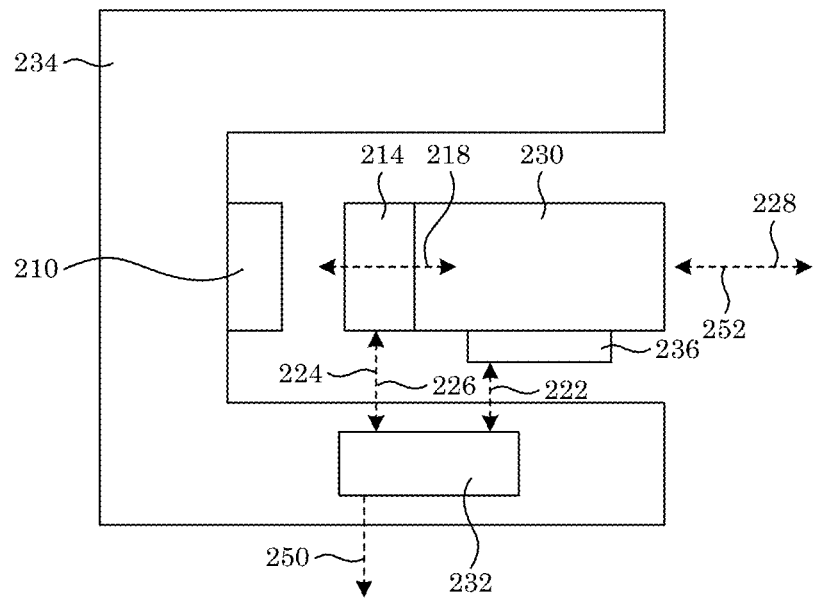
FIG. 3 shows a dynamic force contactor.

In an embodiment, with reference to FIG. 3, dynamic force contactor 200 includes accelerometer 236 disposed on armature 230. It is contemplated that accelerometer 236 can be disposed on other parts of dynamic force contactor 200 besides or in addition to armature 230. Accelerometer 236 can provide an acceleration of armature 230, housing 234, and the like depending on a location of disposal of accelerometer 236.

Figure 4:
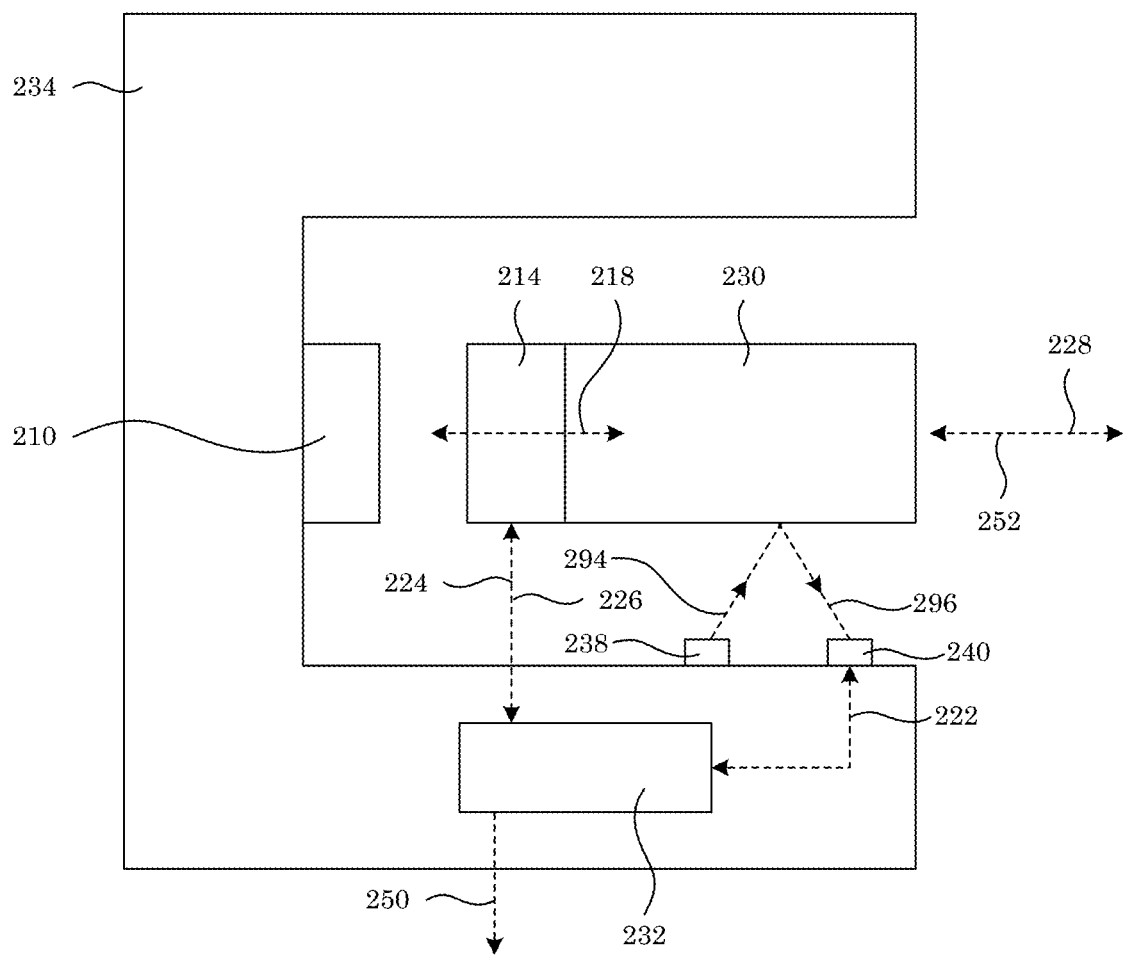
FIG. 4 shows a dynamic force contactor.
Figure 5:
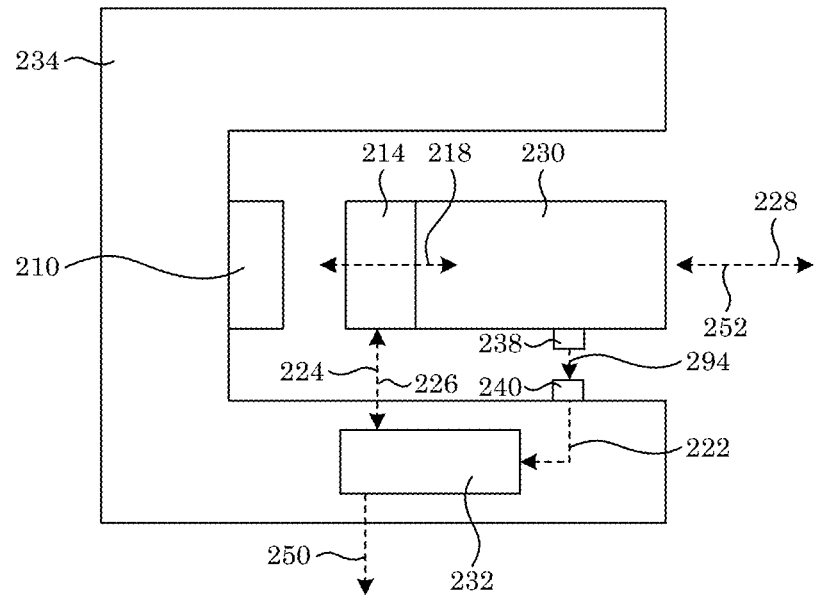
FIG. 5 shows, in panel A, dynamic force contactor in which light from a light source is received by a photodetector when an armature is disposed at a first reciprocation position, and panel B shows the dynamic force contactor in which the armature is disposed at a second reciprocation position such that light from the light source is not received by the photodetector.
Figure 5:
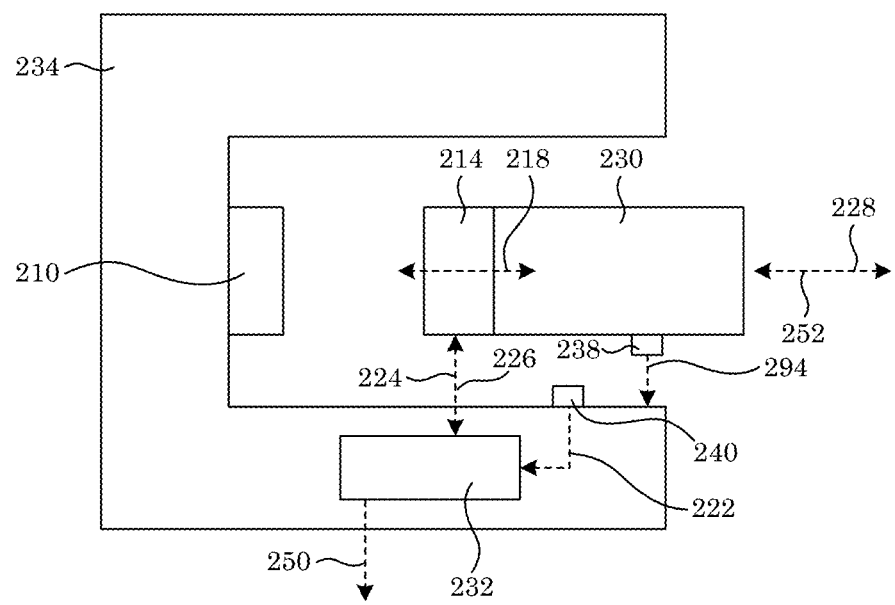

In an embodiment, with reference to FIG. 4 and FIG. 5, dynamic force contactor 200 includes light source 238 disposed on housing 234 or armature 230 and light detector 240 disposed on housing 234 or armature 230. Light source 238 can produce direct light 294 that reflects from armature 230 as reflected light 296 that is detected by photodetector 240 is shown in FIG. 4. Here, as Armature 230 reciprocates in reciprocating direction 228, an intensity of reflected light 296 from armature 230 temporally changes repeatably as a function of a position of armature 230 relative to light source 238 so that reciprocation velocity 222 of armature 230 is determined from the temporal variation of intensity of reflected light 296. As shown in panel A of FIG. 5, direct light 294 from light detector 240 is received by light source 238 when armature 230 is disposed at a first reciprocation position, and panel B shows dynamic force contactor 200 in which armature 230 is disposed at a second reciprocation position such direct light 294 from light source 238 is not received by light detector 240. Here, an amount of direct light 294 received by light detector 240 temporally changes repeatably as a function of a position of armature 230 relative to housing 234 so that reciprocation velocity 222 of armature 230 is determined from the temporal variation of intensity of direct light 294 as received by light detector 240. It should be appreciated that a mutual position of light detector 240 and light source 238 can be changed between housing 234 and armature 230.

Figure 6:
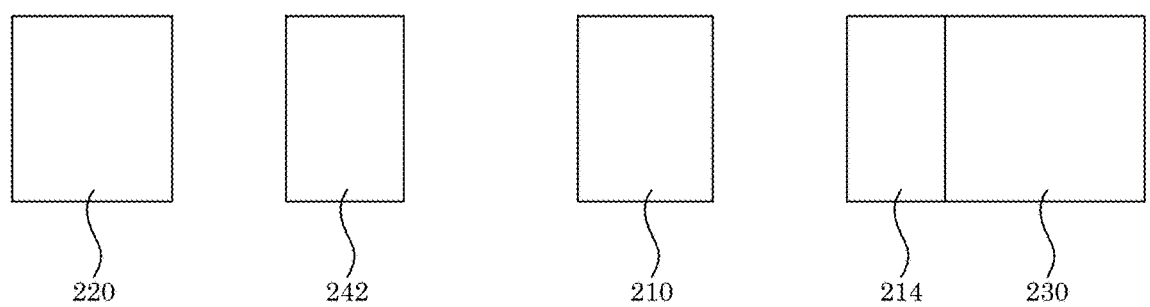
FIG. 6 shows a dynamic force contactor.
Figure 7:
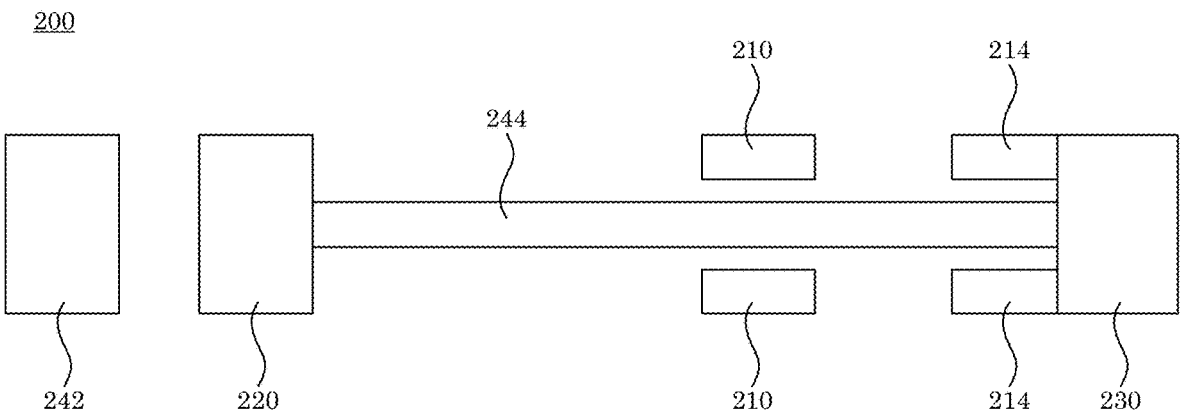
FIG. 7 shows a dynamic force contactor.

In an embodiment, with reference to FIG. 6 and FIG. 7, dynamic force contactor 200 includes secondary electrical conductor 220 disposed opposing electrical conductor 214 such that magnet 210 is interposed between second electrical conductor 220 and electrical conductor 214. Secondary magnet 242 can be disposed opposing electrical conductor 214 such that magnet 210 is interposed between secondary magnet 242 and electrical conductor 214. As shown in FIG. 6, secondary magnet 242 can be interposed between magnet 210 and secondary electrical conductor 220. As shown in FIG. 7, secondary electrical conductor 220 can be interposed between magnet 210 and secondary magnet 242. Here, coupler 244 can be in mechanical communication with and interposed between secondary electrical conductor 220 and armature 230.

Figure 8:
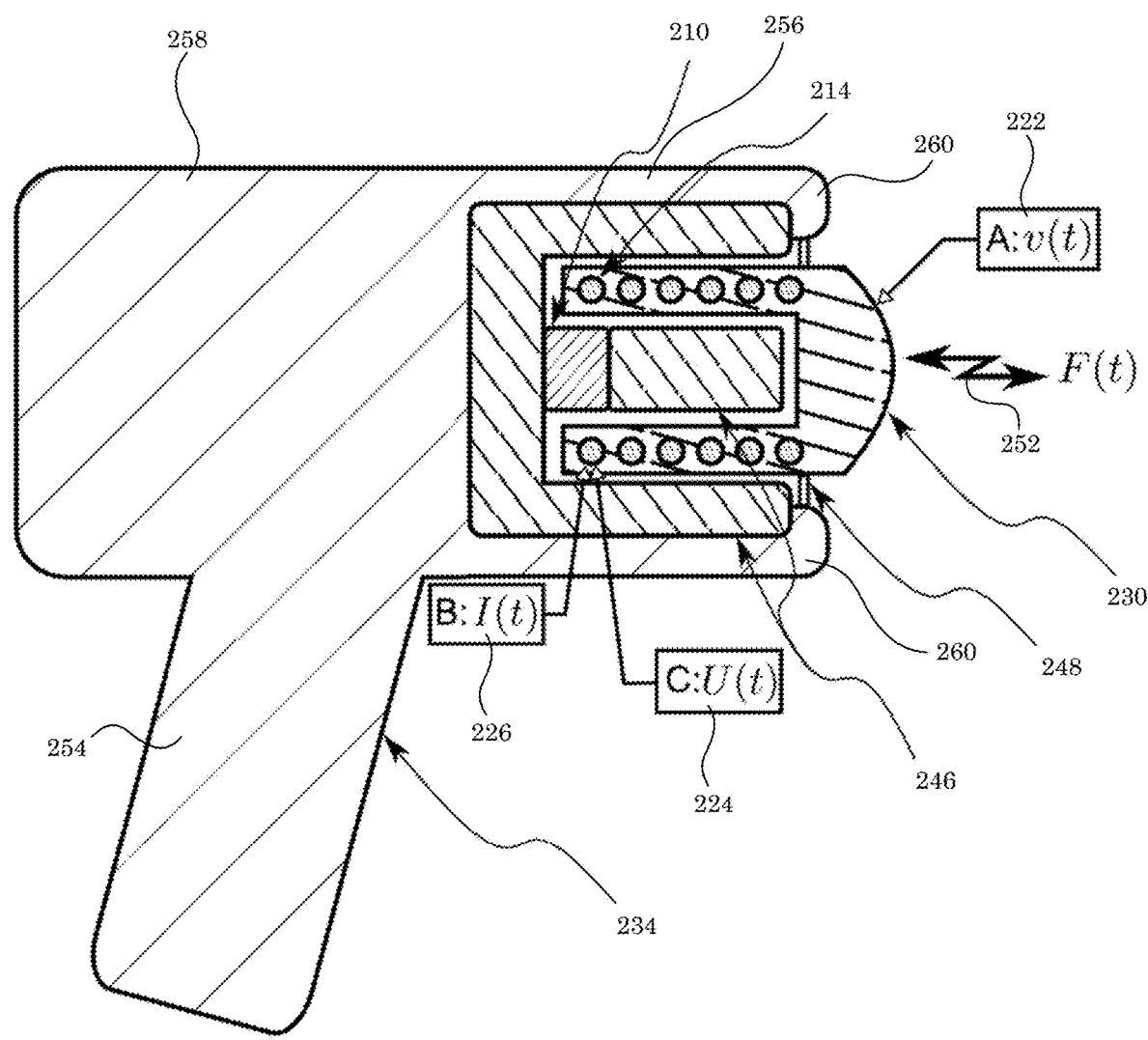
FIG. 8 shows a dynamic force contactor.
Figure 9:
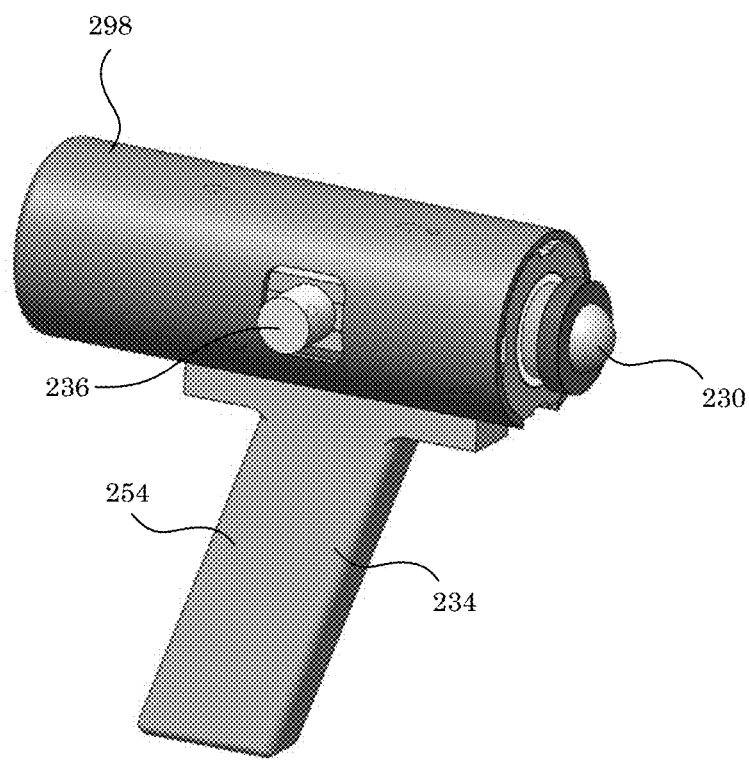
FIG. 9 shows a perspective view of a dynamic force contactor in panel A and an exploded view of the dynamic force contactor in panel B.
Figure 9:
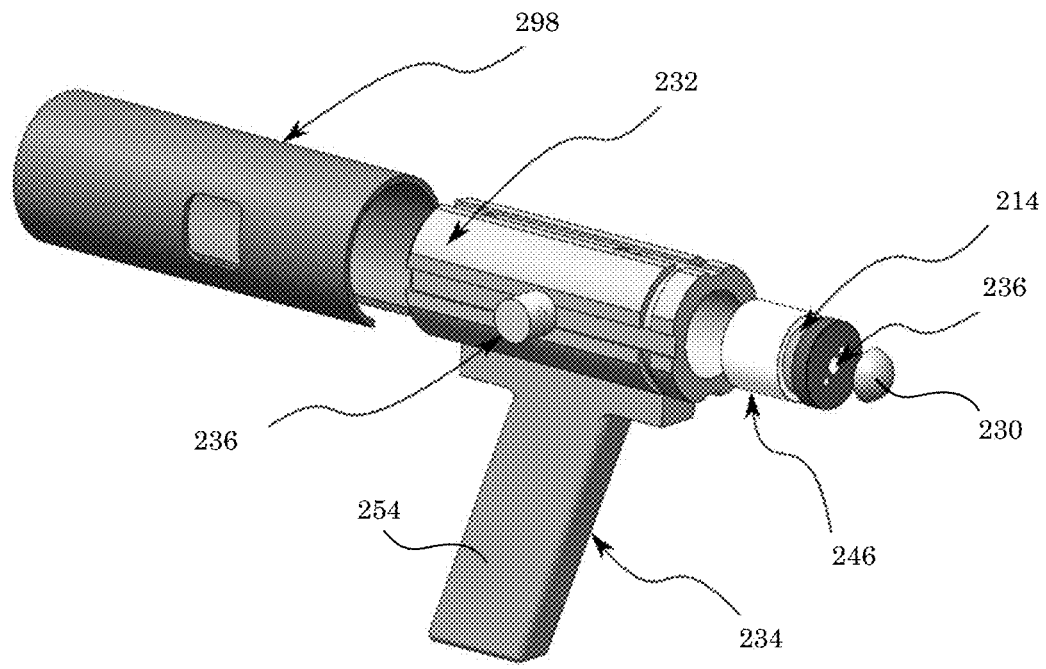

In an embodiment, with reference to FIG. 8 and FIG. 9, dynamic force contactor 200 includes magnetic field guide 246 disposed proximate to magnet 210 and that provides a selected shape of magnetic field 212 in which electrical conductor 214 is disposed and interacts with to produce Lorentzian force 218. Armature guide 248 is disposed proximate to the armature 230 and that provides a linear motion in the reciprocating direction 228 of the armature 230. Housing 234,234 can include flange 260, rostrum 256, caudal member 258, and handle 254. Armature guide 248 can be in contact with flange 260 so that armature guide 248 is linear motion along reciprocating direction 228. Also, various components of dynamic force contactor 200 are disposed in rostrum 256 and held in place by flange 260. It is contemplated that magnetic field guide 246 contact and inner wall of rostrum 256 and flange 260 so that magnetic field guide 246 and magnet 210 remain stationary with respect to housing 234. Enclosure 298 can be disposed on dynamic force mediator 232 elements of dynamic force contactor 200 is shown in FIG. 9.

Dynamic force contactor 200 produces dynamic force 252 and dynamic force signal 250. Dynamic force contactor 200 includes magnet 210 that produces magnetic field 212, which interacts with alternating current 226 within electrical conductor 214 to produce Lorentzian force 218. Lorentzian force 218 moves armature 230 in reciprocating direction 228 and applies dynamic force 252 to structure 266. Dynamic force 252 is measured using dynamic force mediator 232 by measuring alternating voltage 224, alternating current 226, and reciprocation velocity 222. In an embodiment, magnet 210 is a permanent or electric magnet. In an embodiment, magnet 210 is a rare earth permanent magnet.

Magnet 210 produces magnetic field 212, also referred to as magnetic field 212, that has a magnetic field strength from a nano-Tesla to tens of Tesla, specifically from 0.01 Tesla to 10 Tesla, and more specifically from 0.1 Tesla to 2 Tesla. In an embodiment, magnetic field 212 is produced by a rare earth permanent magnet.

Electrical conductor 214 is disposed in magnetic field 212 and communicates alternating current 226. In an embodiment, electrical conductor 214 can be a single or multi-turn coil of wire. Lorentzian force 218 is generated from electrical conductor 214 interacting with magnetic field 212. Secondary electrical conductor 220 is disposed in magnetic field of secondary magnet 242 and generates a force that moves armature 230 along reciprocating direction 228. Reciprocation velocity 222 is a velocity of armature 230 along reciprocating direction 228. Alternating voltage 224 is the voltage across electrical conductor 214. Alternating current 226 is the current flowing through electrical conductor 214. Reciprocating direction 228 is a primary direction along which armature 230 reciprocates. Armature 230 reciprocates and applies dynamic force 252 to structure 266.

Dynamic force mediator 232 can include a circuit that is used to measure alternating voltage 224, alternating current 226, and reciprocation velocity 222. In an embodiment, with reference to FIG. 10, dynamic force mediator 232 includes current source 262 that supplies electrical current to electrical conductor 214. Shunt resistor 264 is arranged in parallel and in communication with current source 262 to provide a measure of the alternating current 226. Here, alternating voltage 224 is measured across terminals 300.

Housing 234 houses all or some components that generates or measures dynamic force 252. Accelerometer 236 measures acceleration of housing 234. The acceleration is used to calculate displacement or velocity of housing 234. Light source 238 can be used with light detector 240 to determine relative motion of armature 230 and housing 234. Light detector 240 can be used with light source 238 to determine relative motion of armature 230 and housing 234. Secondary magnet 242 can be used with secondary electrical conductor 220 to generate motion of armature 230. Coupler 244 provides a physical link between secondary electrical conductor 220 and secondary magnet 242 to armature 230. Magnetic field guide 246 is a high permeability material that shapes magnetic field 212 so that it interacts with electrical conductor 214. Armature guide 248 constrains motion of armature 230 along reciprocating direction 228. Dynamic force signal 250 is a signal that is proportional to dynamic force 252, which is calculated from alternating voltage 224, alternating current 226, and reciprocation velocity 222 optionally with a correction. Dynamic force 252 is a time-varying force applied to structure 266. Handle 254 is member by dynamic force contactor 200 is held with a hand or mount. Flange 260 mechanically supports flexure 292 and is attached to housing 234. Current source 262 generates alternating current 226. Shunt resistor 264 measures alternating current 226. Structure 266 can include force sensor 268, which can be calibrated with dynamic force contactor 200. Force sensor 268 is a force-indicating instrument disposed on structure 266 and can be calibrated with dynamic force contactor 200. Unknown force signal 270 is a signal from force sensor 268 that is calibrated with dynamic force contactor 200. Support material 272 mechanically reinforces magnetic field guide 246. Optical cavity mirror 278 is a mirror disposed on an optical cavity that measures displacement and reciprocation velocity 222 of armature 230. Fiber optic 280 transmits light from optical cavity mirror 278 to optical signal 286 output. Wire 282 communicates alternating voltage 224 and alternating current 226. Supply current 284 generates alternating current 226. Optical signal 286 is an output of the optical cavity from fiber optic 280. Strain gage 288 measures strain of shear web 290 that indicates force applied to force sensor 268. Shear web 290 deflects when a force is applied to the sensor. Flexure 292 constrains the primary motion of armature 230 along reciprocating direction 228. Direct light 294 is light emitted from light source 238 and can be detected directly or indirectly by light detector 240. Reflected light 296 is light from light source 238 that is reflected from armature 230 and detected by light detector 240. Enclosure 298 covers dynamic force mediator 232. Terminal 300 is an access location wherein alternating voltage 224 is measured.

It should be appreciated that various components of dynamic force contactor 200 can be made from a metal, plastic, glass, ceramic, polymer, composite, and the like or a combination thereof. Materials of construction selected for the components should not interfere with operability of dynamic force contactor 200.

Dynamic force contactor 200 can be made in various ways. In an embodiment, a process for making dynamic force contactor 200 includes disposing electrical conductor 214 proximate to magnet 210 and in magnetic field 212 so that alternating current 226 of electrical conductor 214 is oriented perpendicular to magnetic field 212, wherein electric field 216 in combination with magnetic field 212 from magnet 210 provide Lorentzian force 218; disposing armature 230 proximate to magnet 210 such that electrical conductor 214 is disposed on armature 230, wherein armature 230 reciprocates in reciprocating direction 228 relative to magnet 210 in response to Lorentzian force 218 and wherein armature 230 produces dynamic force 252; and disposing dynamic force mediator 232 in communication with electrical conductor 214 and armature 230 such that dynamic force mediator 232 monitors alternating voltage 224 across electrical conductor 214, alternating current 226 through electrical conductor 214, and reciprocation velocity 222 of armature 230. The process for making dynamic force contactor 200 also can include disposing magnet 210, electrical conductor 214, armature 230, and dynamic force mediator 232 in housing 234. The process for making dynamic force contactor 200 also can include disposing accelerometer 236 on armature 230; disposing light source 238 on housing 234 or armature 230; disposing light detector 240 on housing 234 or armature 230; disposing secondary electrical conductor 220 opposing electrical conductor 214 such that magnet 210 is interposed between second electrical conductor 220 and electrical conductor 214; disposing magnetic field guide 246 proximate to magnet 210 to provide a selected shape of magnetic field 212 in which electrical conductor 214 is disposed; disposing armature guide 248 proximate to the armature 230 to provide linear motion in reciprocating direction 228 of armature 230; providing housing 234 with flange 260, rostrum 256, caudal member 258, and handle 254; or disposing enclosure 298 on dynamic force mediator 232 elements of dynamic force contactor 200 as shown in FIG. 9. Making individual components of dynamic force contactor 200 can be accomplished using, e.g., additive manufacturing, machining, manufacturing techniques, and the like. Components can be joined together with a mechanical fastener, adhesives, and the like. Alignment of armature 230 in magnetic field 212 can be performed by using alignment tooling.

Figure 11:
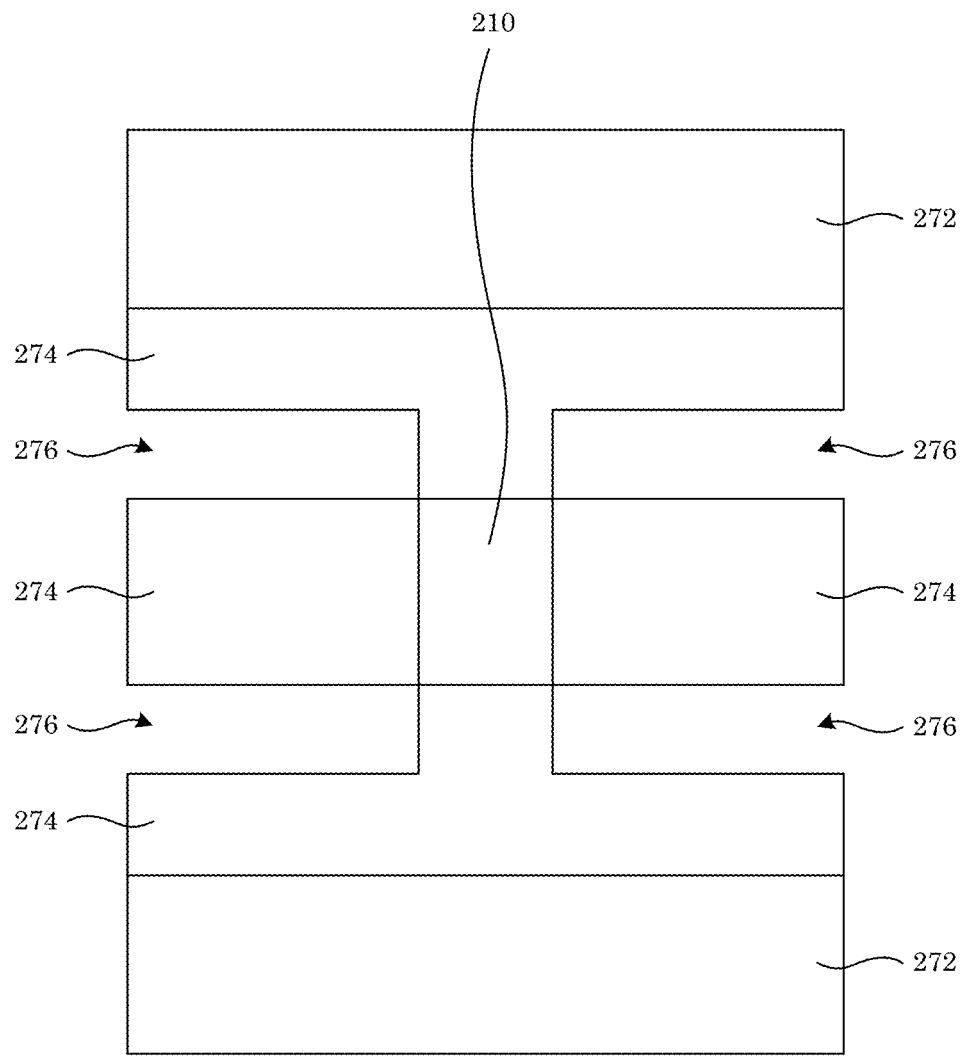
FIG. 11 shows a magnet disposed on a high permeability material that is disposed on support material.

Dynamic force contactor 200 can be made by combining: a magnet (e.g., an electromagnet or permanent magnet); an electrical conductor (e.g., metallic wire); light and rigid material of high electrical resistivity; a resistor; a fast voltage measuring circuit (e.g., a voltmeter); material of high magnetic permeability; material of sufficient strength and rigidity to support the magnet, electrical conductor, and light rigid material; a flexure spring; an accelerometer; and an AC electrical power source (e.g., a signal generator, amplifier, and the like). With reference to FIG. 11, magnet 210 and magnetic field guide 246 can be arranged to produce spaced apart regions of magnetic field 212. Support material 272 supports magnet 210 and magnetic field guide 246 and shapes them into a selected shape.

Electrical conductor 214 is disposed to pass through magnetic field 212 in series to conduct a current perpendicular to magnetic field 212. Two sections of electrical conductor 214 passing through magnetic field 212 can be identical. Electrical conductor 214 can be two serially-connected coils that are disposed in one of the two radial magnetic fields 212. One sections of electrical conductor 214 in magnetic field 212 (e.g., magnetic field 212) is supported on light and rigid material that supports electrical conductor 214 and transmits force on electrical conductor 214 to external structure 266 or force sensor 268. This piece of material move independently with respect to magnetic field 212 except for support by flexure springs, which locate electrical conductor 214 within magnetic field 212 and are mounted for freedom along a selected axis of operation, e.g., reciprocating direction 228, and provide restraint with respect motion transverse to reciprocating direction 228. Accelerometer 236 can be disposed on the light rigid material to measure reciprocation velocity 222. A portion of electrical conductor 214 disposed in a second area of magnetic field 212 can be rigidly mounted to support material 272. A resistor can be connected in series with electrical conductor 214 and the power source. The voltage measurement circuits can be electrically connected across the resistor to measure alternating current 226. Voltage measurement circuits can be connected across each of the two sections of electrical conductor 214 located in magnetic field 212 to measure voltage.

The resistor, voltage measuring circuit, magnetic field guide 246, or combination thereof can be mechanically connected to remaining components to form a self-contained device. Control electronics can be integrated in dynamic force contactor 200 such that dynamic force signal 250 is an analog or digital signal indicative of force. An integrated, visible display, e.g., an LCD, or touch screen, can display force. It is contemplated that the resistor or the second magnetic field 212 and associated section of electrical conductor 214 passing therethrough can be physically separated and mechanically decoupled from dynamic force contactor 200.

Dynamic force contactor 200 has numerous advantageous and unexpected benefits and uses. In an embodiment, a process for providing dynamic force 252 includes disposing armature 230 of dynamic force contactor 200 in contact with structure 266 to which dynamic force 252 is applied; providing electrical power to electrical conductor 214, the electrical power including a time-varying amplitude; and reciprocating armature 230 at reciprocation velocity 222 in response to providing electrical power to electrical conductor 214 to provide dynamic force 252 to structure 266.

The process for providing dynamic force 252 further can include measuring the alternating voltage 224, alternating current 226, and the reciprocation velocity 222 which are used to calculate the Lorentzian force 218. In an embodiment, the velocity can be determined with the optical cavity mirror 278 or a light source 238 and light detector 240. Additionally, the acceleration of the housing can be measured with an accelerometer 236, which can be used to apply necessary corrections to the measurements.

In the process for providing dynamic force 252, disposing armature 230 of dynamic force contactor 200 in contact with structure 266, and current source 262 generates alternating current 226 in electrical conductor 214, which interacts with magnetic field 212 to produce a Lorentzian force 218.

In the process for providing dynamic force 252, providing electrical power to electrical conductor 214 can be provided by a current source that is external or internal to dynamic force contactor 200.

In the process for providing dynamic force 252, reciprocating armature 230 at reciprocation velocity 222 can be measured by an optical interferometric technique that can include optical cavity mirror 278. The velocity can also be measured using light source 238 and light detector 240.

In an embodiment, a process for operating dynamic force contactor 200 includes connecting the movable piece of light material supporting electrical conductor 214, e.g., to structure 266 or force sensor 268, such as by contacting armature 230 to structure 266 or fastening dynamic force contactor 200 to structure 266 (wherein a fastener such as a bolt is included in the light material); energizing the electrical power source and providing a selected time-varying waveform to electrical conductor 214; measuring time-varying voltage U1($t$) measured across resistor R; determining current flowing in electrical conductor 214 as I(t)=U1($t$)/R; and from measurements of voltage across electrical conductor 214 disposed in magnetic field 212, U2($t$) and U3($t$), determining alternating voltage 224 U(t) induced by motion of first section of electrical conductor 214 as U(t)=U2($t$)−U3($t$); determining force generated by current flowing through electrical conductor 214 as F(t)=I(t) V(t)/U(t), wherein this force is equal to the force applied to structure 266, $F_{app}$(t), plus any force F1($t$) to accelerate electrical conductor 214 and supporting material and accelerometer 236 as well as force F2(*t*) that deflects the mounting flexures such that the force generated is $F_{app}(t)=F(t)-F1(t)-F2(t)$. When flexures have negligible stiffness in the direction of motion, F2(*t*) can be ignored. The process also can include calculating F1(*t*) from acceleration A(t) measured by accelerometer 236, and known mass M of moving electrical conductor 214, support structure, and accelerometer 236. The process can include determining $F_{app}(t)=I(t) V(t)/U(t)-M A(t)$, wherein, if mass M or acceleration A(t) is sufficiently small, F1(*t*) is negligible, and $F_{app}(t)=I(t) V(t)/U(t)$.

Dynamic force contactor 200 also can be used to calibrating a force sensor to be metrologically traceable to the international system of units (SI). As used herein, "metrologically traceable" refers to a property of a measurement result whereby the result can be related to a reference through a documented unbroken chain of calibrations, each contributing to the measurement uncertainty. In this regard, metrological traceability herein accords with the International Vocabulary of Metrology—Basic and General Concepts and Associated Terms, VIM, 3rd edition, JCGM 200: 2008, also published as ISO Guide 99 by ISO (ISO/IEC Guide 99-12:2007, International Vocabulary of Metrology—Basic and General Concepts and Associated Terms, VIM (2008). As used herein, "calibration" refers to an operation that, under specified conditions, in a first step, establishes a relation between the quantity values with measurement uncertainties provided by measurement standards and corresponding indications with associated measurement uncertainties and, in a second step, uses this information to establish a relation for obtaining a measurement result from an indication. It is contemplated that a calibration can be expressed by a statement, calibration function, calibration diagram, calibration curve, calibration table, and the like and can include an additive or multiplicative correction of the indication with associated measurement uncertainty.

Figure 12:
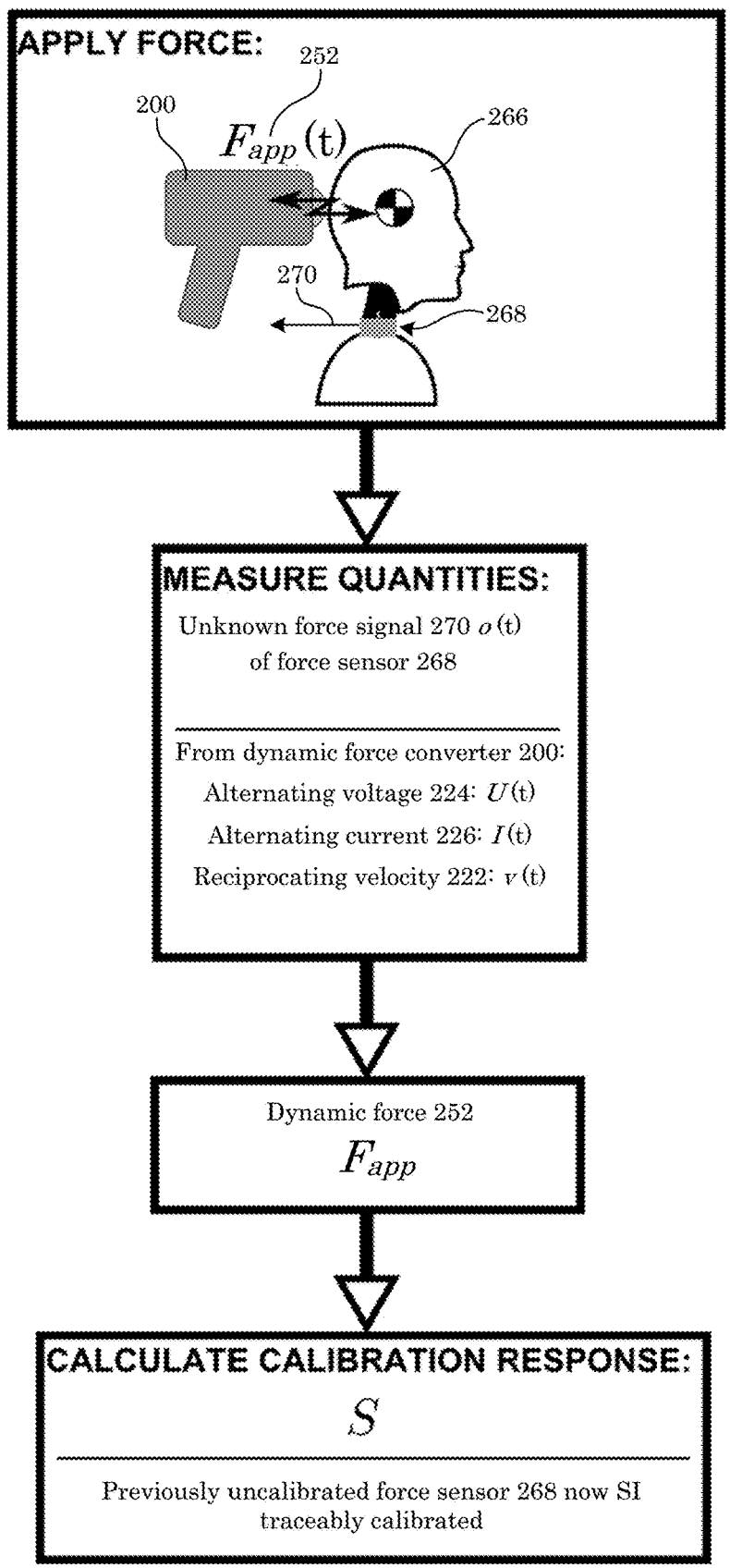
FIG. 12 shows providing a dynamic force to a structure and calibrating a force sensor to be traceable to the international system of units (SI)

In an embodiment, with reference to FIG. 12, a process for calibrating force sensor 268 to be traceable to the SI includes: disposing armature 230 of dynamic force contactor 200 in contact with structure 266 to which force sensor 268 under calibration is disposed; providing electrical power to electrical conductor 214, the electrical power including a time-varying amplitude; reciprocating armature 230 at reciprocation velocity 222 in response to providing electrical power to electrical conductor 214; providing dynamic force 252 to structure 266; measuring alternating voltage 224; determining alternating current 226 through electrical conductor 214; determining reciprocation velocity 222 of armature 230; determining dynamic force 252 from reciprocation velocity 222, alternating voltage 224, and alternating current 226; and determining a calibration response S for force sensor 268 to calibrate force sensor 268 to be traceable to the SI, wherein reciprocation velocity 222, alternating voltage 224, and alternating current 226 are traceable to the SI.

In the process for calibrating force sensor 268 to be traceable to the SI, disposing armature 230 of dynamic force contactor 200 is placed in contact with structure 266 and dynamic force 252 is applied.

In the process for calibrating force sensor 268 to be traceable to the SI, providing electrical power to electrical conductor 214 can be performed with current source 262 that generates alternating current 226 in electrical conductor 214, which interacts with magnetic field 212 to produce Lorentzian force 218.

In the process for calibrating force sensor 268 to be traceable to the SI, reciprocating armature 230 at reciprocation velocity 222 can be measured using optical interferometric techniques that can include optical cavity mirror 278. The velocity can also be measured with light source 238 and light detector 240.

In the process for calibrating force sensor 268 to be traceable to the SI, providing dynamic force 252 to structure 266 can be done by using current source 262 to generate alternating current 226 in electrical conductor 214, which interacts with magnetic field 212 to produce Lorentzian force 218.

In the process for calibrating force sensor 268 to be traceable to the SI, measuring alternating voltage 224 can be done across terminal 300 with a voltmeter that is traceable to the SI, which can be integrated with dynamic force contactor 200 or can be a separate instrument.

In the process for calibrating force sensor 268 to be traceable to the SI, determining alternating current 226 through electrical conductor 214 can be done by using shunt resistor 264 in dynamic force mediator 232.

In the process for calibrating force sensor 268 to be traceable to the SI, determining reciprocation velocity 222 of armature 230 can be measured using optical interferometric techniques that can include optical cavity mirror 278. The velocity can be measured using light source 238 and light detector 240.

In the process for calibrating force sensor 268 to be traceable to the SI, determining dynamic force 252 from reciprocation velocity 222, alternating voltage 224, and alternating current 226 can be calculated using Kibble's method, described below.

In the process for calibrating force sensor 268 to be traceable to the SI, determining a calibration response S for force sensor 268 can be done by determining dynamic force 252 applied by dynamic force contactor 200 using Kibble's method and by measuring unknown force signal 270. The calibration response is calculated as S=F/O, wherein F is the Fourier Transforms of dynamic force 252, and O is the Fourier transforms of unknown force signal 270.

Dynamic force contactor 200 and processes disclosed herein have numerous beneficial uses, including providing an SI traceable, dynamic force to be simultaneously realized and measured in an environment inside or outside of a laboratory setting, which transfers calibration to a force transducer in its application setting.

Moreover, dynamic force contactor 200 and processes herein have numerous advantageous properties. In an aspect, dynamic force contactor 200 can have a smaller uncertainty than conventional transfer standards. Moreover, dynamic force contactor 200 can calibrate a force transducer to a higher bandwidth than conventional products.

Dynamic force contactor 200 and processes herein unexpectedly provide and measure dynamic force using electrical quantities as a primary standard up to high mechanical frequencies in contrast to conventional transfer standards that are secondary standards.

The articles and processes herein are illustrated further by the following Examples, which are non-limiting.

EXAMPLES

Example 1. Dynamic Force Contactor 200 as a Portable Dynamic Force Standard

Here, dynamic force contactor 200 is a portable dynamic force standard device that generates a mechanical force so that an applied force can be determined through electrical and mechanical measurements. Dynamic force contactor 200 is a portable, dynamic force calibrator that can be used to dynamically calibrate force sensors in the application setting in which they are used. This device overcomes challenges in measuring dynamic forces, namely that a force sensor's dynamic calibration response changes depending on the application setting in which it is used.

Dynamic force contactor 200 produces a Lorentz force generated by current-carrying wire 214 in magnetic field 212 to apply dynamic force 252 to force sensor 268 that can be used to dynamically calibrate force sensor 268 in its application setting. As shown in FIG. 8, a wound coil electrical conductor 214 is attached to armature 230, which sits in magnetic field 212 that is generated by magnet 210 and magnetic field guide 246. Armature 230 engages armature guide 248 for linear motion. These components are disposed in a portable housing 234. A current moving through electrical conductor 214 in magnetic field 212 produces Lorentzian force 218 that moves armature 230. Lorentzian force 218 F(t) can be applied to force sensor 268 or structure 266. Labels, A, B, and C correspond to time-varying responses reciprocation velocity 222, alternating voltage 224, and alternating current 226 in FIG. 8. To determine dynamic force 252, reciprocation velocity 222 of armature 230 relative to magnet 210 is determined as well as alternating current 226 through the electrical conductor 214 and alternating voltage 224 across electrical conductor 214.

With reference to FIG. 12, to calibrate force sensor 268, armature 230 of dynamic force contactor 200 is held against force sensor 268 or structure 266 in contact with force sensor 268 to be calibrated. Dynamic force contactor 200 applies dynamic force 252 to force sensor 268 or structure 266 and unknown force signal 270 o(t) of tforce sensor 268 is measured along with alternating voltage 224 U(t), alternating current 226 I(t), and reciprocating direction 228 v(t) of dynamic force contactor 200, which are used to calculate force dynamic force 252 $F_{app}(t)$ that was applied from dynamic force contactor 200. A dynamic calibration response, also referred to as sensitivity S, of force sensor 268 can be calculated using unknown force signal 270 o(t) and dynamic force 252 $F_{app}(t)$.

FIG. 9 shows dynamic force contactor 200 in a perspective view (panel A) and an exploded view (panel B). Here, accelerometer 236 can be disposed on armature 230 or disposed on a body of dynamic force contactor 200 to measure acceleration of magnet 210. Enclosure 298 encases many of the components of dynamic force contactor 200 such as dynamic force mediator 232 that measures voltage and current, e.g., alternating voltage 224 and alternating current 226. Accelerometers 236 determine reciprocation velocity 222 of electrical conductor 214 relative to magnet 210. Additionally, accelerometer 236 on armature 230 can used to make corrections to dynamic force 252 to make an accurate measurement with lower uncertainty.

Figure 10:
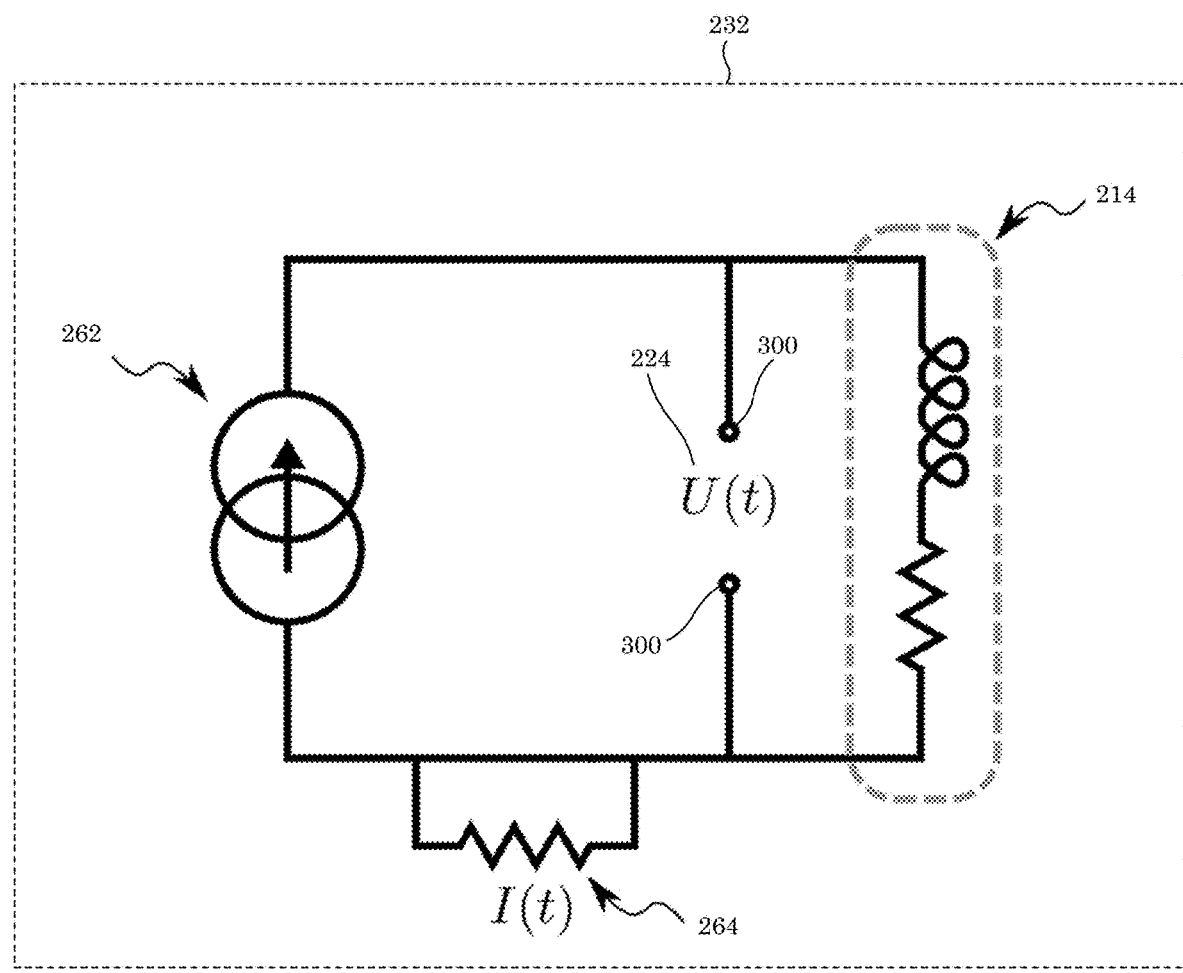
FIG. 10 shows a dynamic force mediator.

Dynamic force mediator 232, e.g., as shown in FIG. 10, is connected to electrical metrological equipment, e.g., a current source, voltage source, digital volt meter, and the like, to measure alternating voltage 224 and alternating current 226. It is contemplated that other circuitry or equipment can be used to measure alternating voltage 224 and alternating current 226. An AC or DC current source 262 produces a current in electrical conductor 214 in magnetic field 212. Alternating voltage 224 across electrical conductor 214 is measured using electric metrological equipment. Additionally, shunt resistor 264 can be used with electric metrological equipment to determine alternating current 226 through electrical conductor 214.

In this manner, dynamic force contactor 200 determines dynamic force 252. It is contemplated that electrical conductor 214 can be a coil disposed in a uniform radial magnetic field 212 generated by magnet 210 that can be a permanent magnet. Time-varying alternating current 226 I(t) in electrical conductor 214 generates a time-varying axial force on electrical conductor 214 according to $$F(t)=BLI(t), \quad (1)$$

where B is the radial magnetic field and L is the length of electrical conductor 214 in the field. The BL product is determined by measuring alternating voltage 224 U(t) across electrical conductor 214 and reciprocation velocity 222 v(t) of electrical conductor 214 relative to magnetic field 212, $$BL = \frac{U(t)}{v(t)}, \quad (2)$$

The voltage drop $U_{tot}(t)$ across electrical conductor 214 is the sum $$U_{tot}(t)=U(t)+U_R(t), \quad (3)$$

where $U_R(t)$ is the drop due to the resistance of electrical conductor 214 (including lead lengths to measurement points) and can be corrected for or rendered negligible.

The force F given by [1] is applied to electrical conductor 214 and is applied to system-under-test ($F_{app}$) less the force $F_{inet}$ used to accelerate the inertia of armature 230 (electrical conductor 214 plus any additional material in which electrical conductor 214 is embedded) and any parasitic forces $F_{par}$ acting on armature 230 due to connected wires, suspension, and air drag.

$$F=F_{app}+F_{inet}+F_{par} \quad (4)$$

The force $F_{inet}$ is given by the product of mass and acceleration of armature 230, $$F_{inet}=\int a(r)\rho(r)dr, \quad (5)$$

where a(r) is the local acceleration and ρ(r) is the local density. The acceleration a can be measured using an accelerometer or interferometer. The mass of armature 230 (and potentially mass distribution) can be known during use of dynamic force contactor 200. Armature 230 can be connected via flexures. Flexible wires can interconnect to electrical conductor 214. For small-amplitude motion of armature 230, $F_{par}$ can be negligible.

With regard to SI traceable measurement or calibration with dynamic force contactor 200, measurement of accelerometer output, voltage of shunt resistor 264, and alternating voltage 224 of electrical conductor 214 can be performed by an external instrument or by a component integrated into dynamic force contactor 200 such as dynamic force mediator 232. Similarly, current source 262 can be an onboard battery or capacitance.

It is contemplated that dynamic force contactor 200 can include different geometries or types of electrical conductor 214 or magnet 210, different ways of measuring reciprocation velocity 222 (including optical methods, such as interferometric measurements in different interferometer configurations), determination of BL product by calculation, different ways of measuring or estimating acceleration of armature 230 and inertial correction, closed-loop operation (e.g., feedback on force, velocity, displacement, acceleration, current, voltage or strain amplitudes), handheld vs mechanically-supported configurations, variations on the force waveforms applied (sine, pulse, chirp, step, random, etc.), various means of measuring or calculating $F_{par}$, using air-bearing support of armature 230 to minimize $F_{par}$, using inductive or capacitive coupling of the current into electrical conductor 214 to eliminate a wire link between electrical conductor 214 and housing 234, type of wire used for a coil of electrical conductor 214, measuring alternating current 226 other than a sensing resistor, and the like.

Alternating current 226 I(t) can be measured, e.g., by placing an known resistance in series with electrical conductor 214 and measuring alternating voltage 224 across electrical conductor 214. Alternating voltage 224 $U_{tot}(t)$ can be measured by a voltmeter, and alternating current 226 v(t) can be measured by an optical interferometer such as the Fabry-Perot interferometer, or by accelerometers attached to armature 230 and housing 234. This measurement may be done simultaneously with application of dynamic force 252 and measurement of alternating current 226 or performed in a separate step.

A size of dynamic force contactor 200 can be selected for a particular application and be small enough to be conveniently portable so that dynamic force contactor 200 can apply known forces to calibrate force measurement systems in various locations and configurations. In other words, dynamic force contactor 200 is ported to a working measurement system. It is contemplated, without limitation, that a practical volume and mass for portability of dynamic force contactor 200 is approximately 2 m$^3$ and 50 kg respectively but dynamic force contactor 200 that are smaller in both metrics by an order of magnitude or more are contemplated. An amplitude of can be, e.g., from 1 mN to 1 kN. An applied bandwidth of which can be from 1 mHz to 50 kHz. An uncertainty within this amplitude and bandwidth can be from 0.01% to 10%.

Example 2. Dynamic Force Contactor 200 as a Portable Dynamic Force Standard

Figure 13:
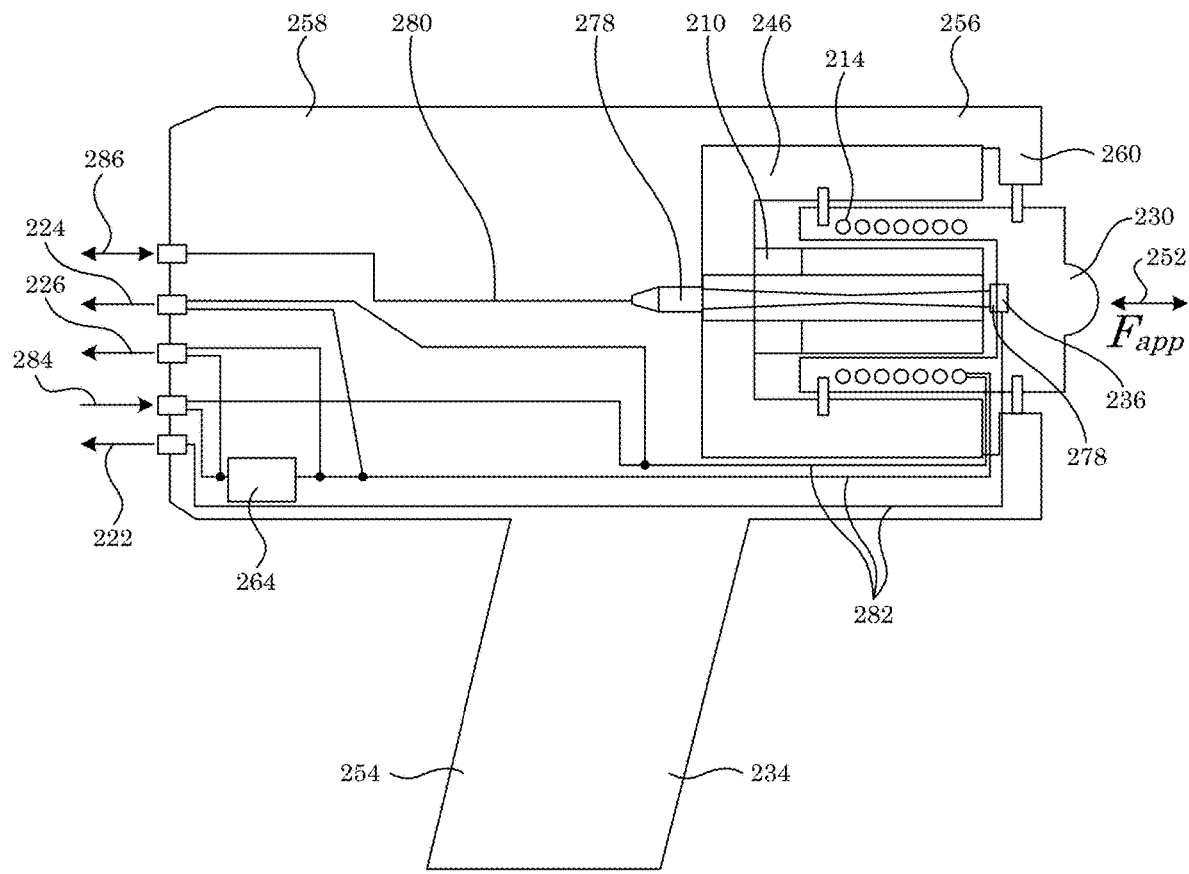
FIG. 13 shows a dynamic force contactor.

Here, equations are numbered starting again with equation 1, and dynamic force contactor 200 is a portable dynamic force primary standard that uses Lorentz force on a current-carrying wire in a magnetic field to generate a known force. The device has a size that is effective (e.g., small enough) to be conveniently portable to be used to apply known forces to calibrate force measurement systems in various locations and configurations. The device is taken to the working measurement system and not the other way around although the working measurement system can be taken to the device. With reference to FIG. 13, dynamic force contactor 200 includes a coil as electrical conductor 214 in a uniform radial magnetic field 212 generated by a permanent magnet as magnet 210. A time-varying alternating current 226 I(t) in the coil generates a time-varying axial force on the coil according to $$F(t) = BLI(t), \quad [1]$$

wherein B is the radial magnetic field, and L is the length of the coil in the field. I(t) is measured, e.g., by placing an accurately-known resistance in series with the coil and measuring the voltage drop across it. The BL product is determined by measuring the voltage drop U(t) across the coil and the velocity v(t) of the coil relative to the magnetic field, $$BL = U(t)/v(t) \quad [2]$$

The voltage drop Utot(t) across the coil is the sum $$Utot(t) = U(t) + UR(t) \quad [3]$$

wherein UR(t) is the drop due to the resistance of the coil (including lead lengths to measurement points) and can be corrected for or rendered negligible.

$U_{tot}(t)$ can be measured by a connected voltmeter, and v(t) can be measured by an optical interferometer such as the Fabry-Perot interferometer shown in FIG. 13 or by accelerometers attached to the armature and body. This measurement can be performed simultaneously with the force application (and current measurement) or separately.

The force F given by equation [1] is applied to the coil and applied to system-under-test ($F_{app}$) less the force $F_{inet}$ used to accelerate the inertia of the armature (coil plus any additional material in which the coil is embedded) and any parasitic forces $F_{par}$ acting on the armature due to connected wires, suspension, and air drag.

$$F = F_{app} + F_{inet} + F_{par} \quad [4]$$

The force $F_{inet}$ is given by the product of mass and acceleration of the armature, $$F_{inet} = \int a(r) \rho(r) dr \quad [5]$$

wherein a(r) is the local acceleration and ρ(r) is the local density. The acceleration a may be measured using an attached accelerometer or an interferometer. The armature mass (and potentially mass distribution) is a previously-determined quantity taken to be known during use of the portable standard. As shown in FIG. 13, the armature is connected via flexures, and flexible wires are used to connect to the coil; for small-amplitude motion of the armature during use of the portable standard, these measures render $F_{par}$ negligible.

With reference to FIG. 13, the measurements of accelerometer output, sense resistor voltage, and coil voltage are illustrated as being performed by external instruments but can be integrated into the body of the force-applying unit. Similarly, the power supply can be an onboard battery or capacitance. On the other hand, the sensing resistance shown in FIG. 13 as being incorporated can be external.

Example 3. High Frequency Kibble Balances for Dynamic Force Metrology

Here, equations are numbered starting again with equation 1, and methods are described that generate high frequency (approximately 10 kHz) SI-traceable (International System of Units) dynamic forces using Kibble (watt) balances. Differences between static and high-frequency Kibble balances are discussed. Three potential configurations of Kibble balances for dynamic force metrology, and their relative benefits and drawbacks, are presented. The configurations can be used to design primary dynamic force standards based on Kibble's approach that can be used to calibrate force measurement systems in situ. Such standards can be embedded into engineering structures to provide accurate reference force values.

The Kibble or watt balance provides an accurate experimental method for relating macroscopic values of mechanical quantities (e.g., force, mass, acceleration) to electrical quantities (e.g., voltage, current, resistance). Measurements of Planck's constant using such balances are a basis for the proposed redefinition of the kilogram. A number of different configurations of Kibble balances have been developed or proposed for static measurements. Our device uses the Kibble balance principle to realize SI-traceable (traceable to the International System of Units) forces with frequencies exceeding 10 kHz and uncertainties at or below the percent level.

Traceable dynamic force standards are used for calibrating and testing the accuracy of force measurements in a wide variety of applications, such as material testing, aerodynamic wind tunnel measurements, and automotive crash testing, to name a few. Generally, standards with expanded uncertainties at the level of approximately 1% are used for such applications. Laboratory primary standards have been developed, but uncertainties of such primary systems in the few-percent range have so far been restricted to frequencies less than 5 kHz. Furthermore, the dynamic sensitivity of an assembled force measurement system is not the same as that of the isolated force sensor, reducing the utility of ex-situ calibration of force sensors for dynamic force measurements. Portable or embedded dynamic force standards are needed to calibrate force measurement systems in their operational installations. One such portable dynamic standard is a calibrated force sensor that can be struck against the force measurement system that is to be calibrated, resulting in a common force applied to both devices. By measuring the response of each device, the calibration of the portable standard can be transferred to the application force measurement system. A portable transfer standard of this sort, namely an instrumented hammer, has been calibrated with an uncertainty of less than 2.1% (k=2) up to 5 kHz. However, a portable calibrated force sensor is a secondary standard, as it must itself be traceably calibrated against a primary reference. The dynamic force contactor 200 here is a portable primary standard based on the Kibble principle although dynamic force contactor 200 can be a secondary standard based on a calibration of magnetic field integral against a force standard. Moreover, dynamic force contactor 200 can be integrated into a structure to generate known dynamic forces at a location that is not externally accessible, e.g., including integration with a force transducer as a composite device.

In Kibble balances, a mechanical force (in balances designed to measure mass or Planck's constant this is typically the local gravitational force on a mass) is balanced by a Lorentz force $$\vec{F} = -I \oint_L (\vec{B}(\vec{r}) \times \vec{dl}(\vec{r})) = -I\vec{BL} \qquad (1)$$

where I is the uniform current flowing along a wire (usually in the form of a coil) of length L and differential length element dl, immersed in magnetic field of flux density B. The accurate determination of the value of this BL integral is the main challenge in applying the Lorentz force law for accurate measurements. Kibble evaluated BL from induced voltage UE generated across the wire when it is moved at velocity V through the magnetic field, $$U_g = \vec{V} \cdot \oint_L (\vec{B}(\vec{r}) \times \vec{r}(\vec{dl})) = \vec{V} \cdot \vec{BL} \qquad (2)$$

Thus, measuring voltage UE, velocity V, and current I gives the force F in the direction of BL with magnitude F according to:

$$\vec{V} \cdot \vec{F} = U_g I = |\vec{V}||\vec{F}|\cos\theta \qquad (3)$$

$$F = |\vec{F}| = \frac{U_g I}{V\cos\theta}, \qquad (4)$$

where θ is the angle between the BL and V vectors, and BL≡UE/V is the magnitude of BL. For a remainder of the Example, vector notation is dropped and reference is made to magnitudes F, U, V, and BL.

Demonstrated relative uncertainties of SI-traceable dynamic forces that have bandwidths in the 1 kHz to 5 kHz range are a few percent. The dynamic force contactor 200 has a percent-level uncertainty and operates at frequencies up to 10 kHz or above. This contrasts with static Kibble balances that determine Planck's constant or realize mass with relative uncertainties at the level of $1\times10^{-6}$.

Figure 14:
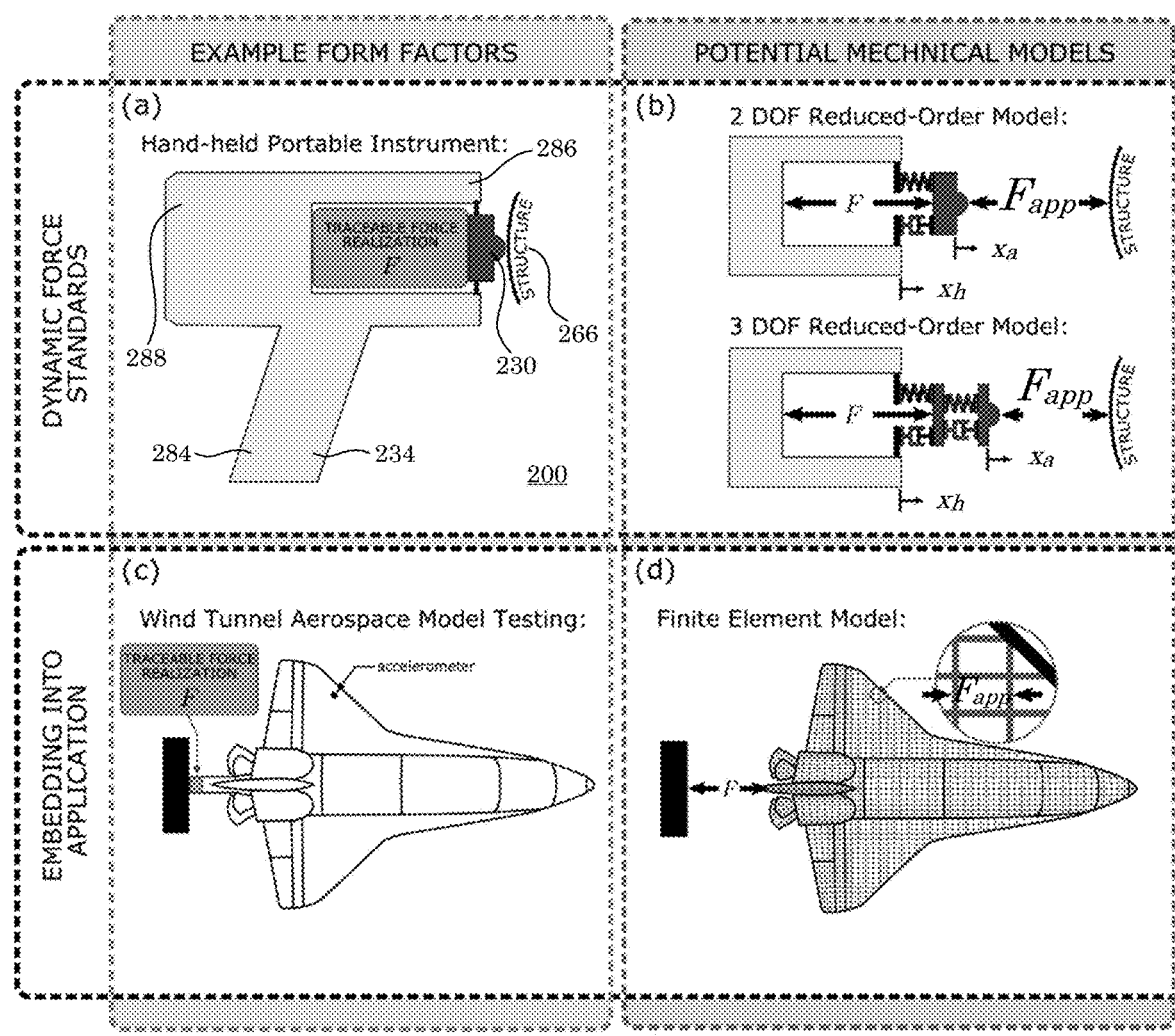
FIG. 14 shows a dynamic force contactor in panel A, a mechanical model of the force contactor in panel B, the dynamic force contactor disposed on an aerospace vehicle in panel C, and a finite element model of the data make force contactor disposed on the aerospace vehicle in panel D.

With the electrical current I(t) varying at kilohertz frequencies, dynamic impedances, particularly coil inductances, are critical. Similarly, the realized Lorentz force may not be the force applied to the target structure because of mechanical filtering effects. The difference between the applied force $F_{app}$ and the force realized by equation (1) F is shown in FIG. 14 with a two degree-of-freedom (DOF) reduced order model. Summing the forces on the armature yields $$F_{app} = F - m_a\ddot{x}_a - k_f(x_a - x_b) - c_f(\dot{x}_a - \dot{x}_b), \qquad (5)$$

where F is the force realized by equation (1), Fapp is the force applied to the structure, ma is the lumped-parameter mass of the armature, kf is the stiffness of the flexures, and xa and xh are the respective positions of the armature and housing of the device. The second term on the right-hand side is a correction of the realized force F due to the inertia of the armature, the third term is a correction for the flexure stiffness, and the last term accounts for dissipation from the flexures. This model assumes that the armature has an internal fundamental resonance frequency that is much higher than the frequency range of interest. If the dynamics of the armature significantly affect the response, then a higher-order model, such as a three DOF system (shown in FIG. 14(b)) or a finite-element model (e.g., FIG. 14(c) & (d)) could be used to obtain an accurate correction. Thus, measured component motions, for example of the armature xa(t) and housing xh(t) in equation (5), are inputs to determining the generated force. In some applications, a location or direction of the force applied by the Kibble standard may differ from that where a known force is desired, involving a model and possibly motional measurements in the application structure as shown in FIG. 14(d) using a finite element model to obtain the desired force.

A difference between static and dynamic operation is the ability to operate in a simultaneous mode in the dynamic case, wherein current, voltage, and velocity are measured at the same time. Thus, BL can be measured at any instant of time. Time variation of BL, due, e.g., to coil motion in a non-uniform B field, is not a source error. The uncertainty associated with BL can depend upon measured values of UE and V, which are functions of time.

Configurations dynamic force contactor 200 as Kibble balance dynamic force standards are discussed with regard to a portable dynamic force standard, but configurations can be inserted into a measurement system such as that shown in FIG. 14(c).

With regard to a single coil with dynamically calibrated BL configuration, a single coil disposed in a magnetic field generates a known force. Here, BL is calibrated in a first measurement, and during subsequent use of the device, the current I is measured to determine force via equation (1). The calibration of BL can be done by using an external device to translate or oscillate the armature with the coil open circuited, while measuring V and UE. The calibration of BL can also be performed with the coil stationary, using a statically calibrated force transducer or deadweights to measure the applied force generated by a measured current I and using equation (1). Here, the Kibble principle plays no role, and the device is just a calibrated voice coil actuator.

Figure 15:
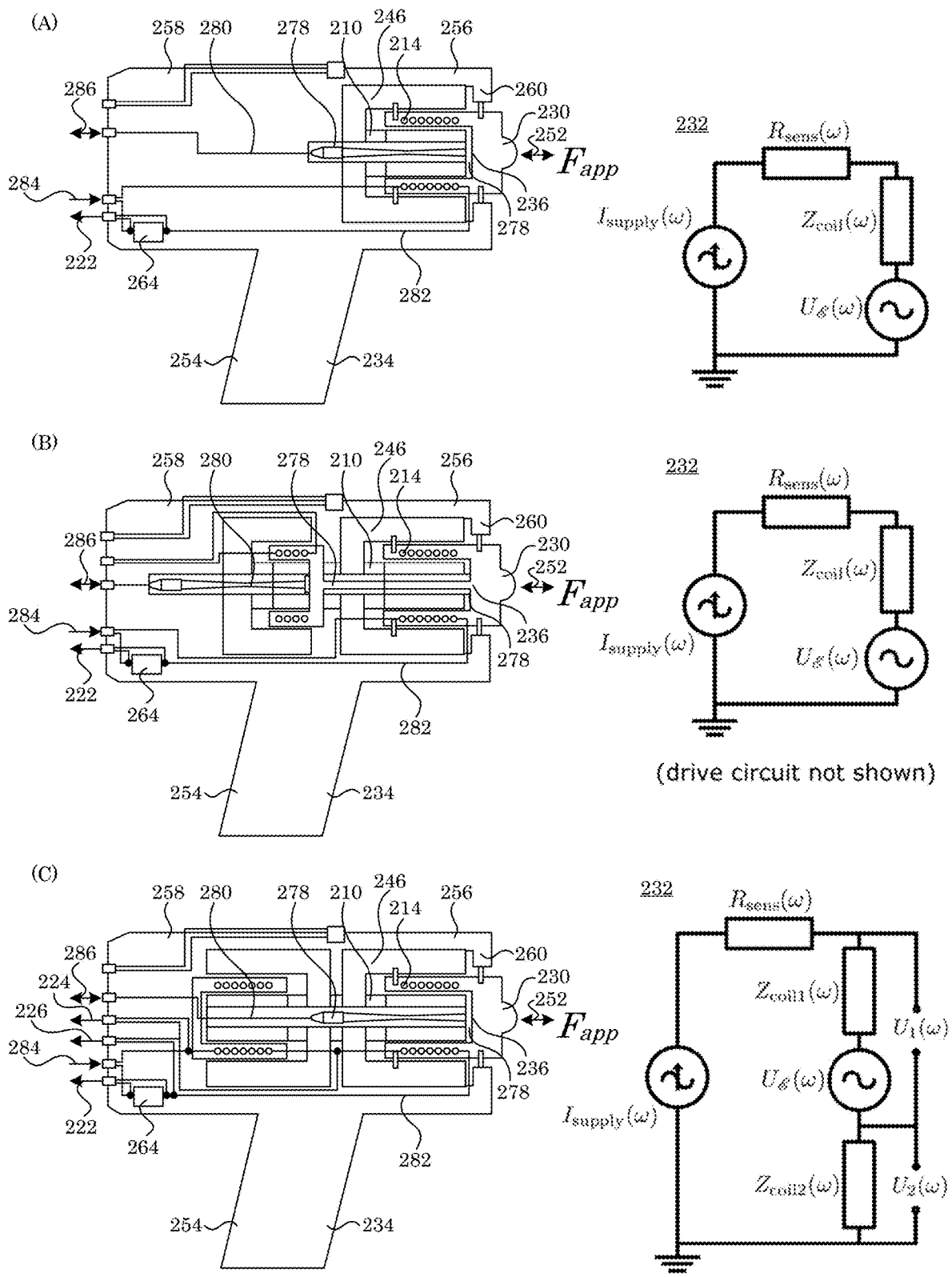
FIG. 15 shows a dynamic force contactor and dynamic force mediator in panel A, a dynamic force contactor and dynamic force mediator in panel B, and a dynamic force contactor and dynamic force mediator in panel C.

An exemplary design is shown in FIG. 15(A) with an electrical circuit model. Current is determined from the voltage drop across a sensing resistor (current shunt) incorporated into the device. During calibration based on the Kibble principle, the induced voltage UE is measured using the same terminals that are used to supply the driving current during use of the device or during force-based calibration. Accelerometer 236 determines acceleration of the housing xh, and an interferometer measures a difference between the housing and the armature xa−xh. The corrections in equation (5) can be calculated using this measure information, along with ancillary measurements such as the flexure stiffness and armature mass. A different type of motional sensor (for example a second accelerometer, mounted on the armature) can be used to measure the relative motion between the coil and the magnetic field.

An advantage is the simplicity of the force measurement, as the prior calibration of the BL product avoids making measurements of voltage UE and velocity V during the force realization. The value of the BL product can be characterized as a function of coil position, as well as angular rotations, and can contribute to uncertainty of the realized force. As such, a magnet and coil geometry that subjects the coil to a highly uniform and radial magnetic field, such as employed in high precision Kibble balances, can be used. Likewise, slower temporal variation of the BL product, e.g., due to the effect of temperature changes, can contribute to uncertainty.

With regard to a dual coil with dual-mode (non-simultaneous) operation, a dynamic extension of Kibble balances is used for static high-precision applications, wherein the measurements of V (t), U(t), and I(t) are performed in separate phases, with a second coil being used to drive the force generation coil at an optimal velocity in the BL-product determination phase. This configuration has the advantage that incorporating the drive mechanism into dynamic force contactor 200 makes it easier to calibrate the BL product closer in time and under similar conditions (e.g., the same temperature) as when the force is realized. Moreover, the BL product can be measured before and after the force realization to check for any changes. Although this mitigates slow temporal variations in the BL product, the spatial dependence can be characterized. An armature structure is shown in FIG. 15(b)

With regard to dual coil with single-mode (simultaneous) operation, simultaneous measurement with a bifilar coil reduces resistive voltage drop. Dynamic force contactor 200 can include two nominally-identical coils with approximately equal complex impedances $Z_{coil1}$ and $Z_{coil2}$. The two coils are arranged in series so that the same current flows through each coil, resulting in approximately equal resistive and inductive voltage drops. Coil 1 includes the armature of the device, is suspended by flexures, and oscillates under action of the Lorentz force on the current in the radial magnetic field, developing induced voltage UE. Coil 2 is fixed and develops no induced voltage. Thus, the voltage drops across the coil are largely canceled by a differential measurement, leaving only the induced voltage drop across coil 1. The induced voltage UE is determined from the difference between the measured voltages U1 and U2 as, $$U_g = U_1 - U_2 - \Delta U_{Z12}, \quad (6)$$

where $\Delta U_{Z12} = I\Delta Z_{12}$ corrects for impedance mismatch between the two coils. The coils are disposed in matched magnetic fields that are achieved by symmetrical construction and selection of matched permanent magnets. Application of the magnetic field to the second coil matches operating points on the nonlinear permeability curves of the pole pieces. Furthermore, both coils are mounted in the device body, which minimizes temperature difference between the two core assemblies that might cause differential magnetization of the permanent magnets and differential permeability of the cores. An alternative design disposed the second coil outside of dynamic force contactor 200, connected by a cable.

With regard to estimated uncertainty, the force uncertainty of dynamic force contactor 200 can depend on values of measured quantities, which can depend on Kibble balance design and mechanical properties of the system to which the balance is coupled.

An uncertainty of the AC current measurement has an expected relative uncertainty of approximately 0.5% at 10 kHz for current amplitudes in the 0.1 A to 1 A range. Another contribution is internal dynamics of the armature. The armature can have a fundamental longitudinal internal resonance above 10 kHz such that the force correction due to the internal dynamics is below 10%. We can calculate such corrections with approximately 5% uncertainty, resulting in an overall uncertainty contribution of approximately 0.5%. Spatial and temporal variation of the magnetic field will contribute to the uncertainty for configurations in FIGS. 15(a) and (b). Using an opposed-magnet design to maximize field uniformity, the uncertainty contribution can be kept to approximately 0.3%. Unexpectedly and beneficially, an uncertainty less than 1% can be achieved up to frequencies of 10 kHz, and conventional traceable dynamic force extend to the few kilohertz frequency range and have uncertainties in the range of a few percent.

Figure 16:
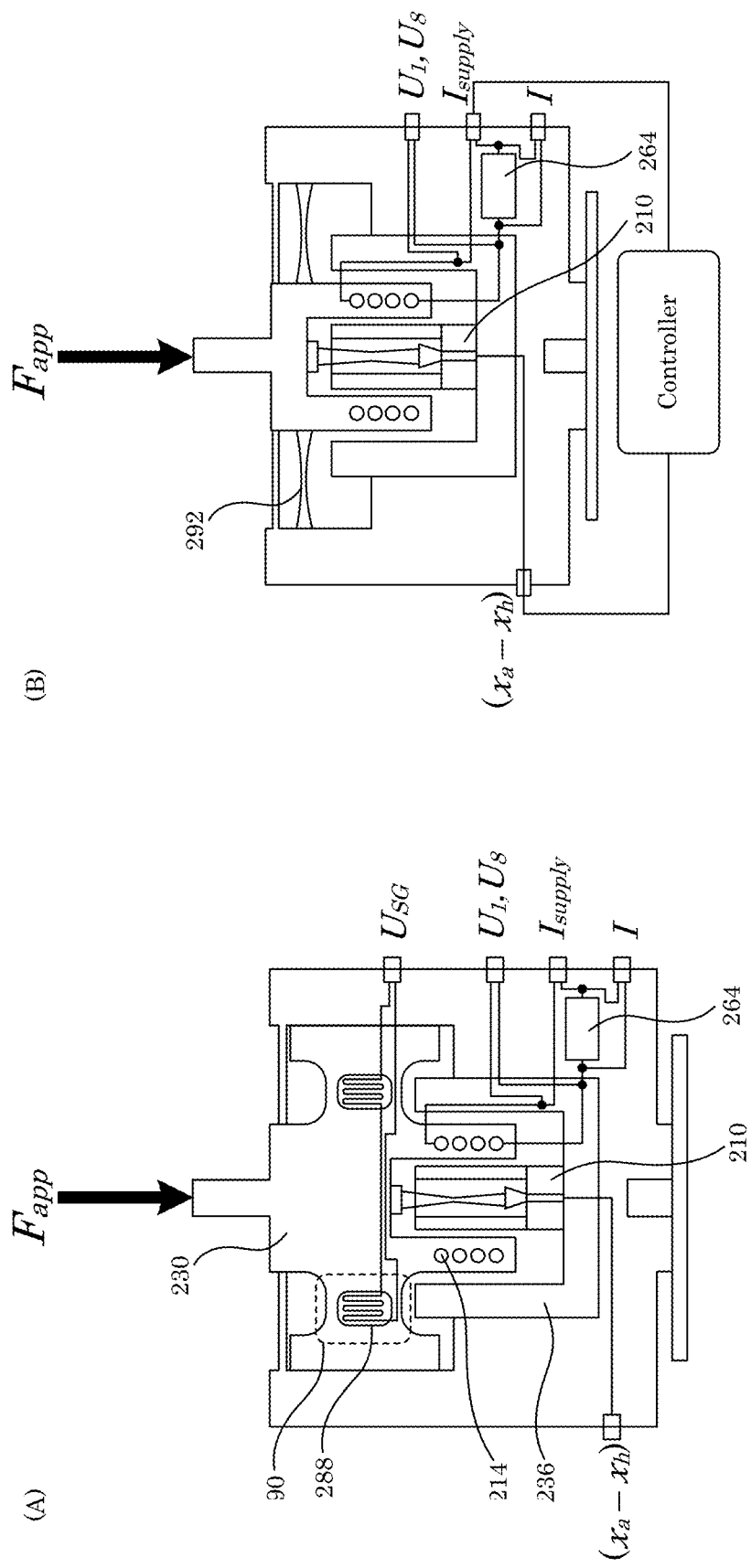
FIG. 16 shows a Kibble balance in panel A and a dynamic force contactor disposed on the Kibble balance.

Dynamic force transducers can be designed based off the above description. Devices discussed here have the advantage of being self-calibrating and can be installed in the host measurement structure and then calibrated in that setting. The dynamic force contactor 200 can be integrated into conventional force transducers, as shown in FIG. 16(a) for a shear-web style design to make the transducer self-calibrating. Conventional force transducers work by measuring the deflection of an element. For the specific shear web force transducer shown in FIG. 16(a), the indication of the force is the voltage from a strain gage circuit USG. An SI-traceable dynamic force therefore is described and by simultaneously measuring F and USG, the transducer sensitivity can be determined within a host structure.

Additionally, dynamic force contactor 200 that includes active feedback control to generate a current to balance or compensate for an applied force by keeping the armature at a fixed position is shown in FIG. 16(b). This also minimizes accelerations of the armature and the need to correct for inertia. This device is a high-frequency electromagnetic compensation force sensor with Kibble-principle calibration. For both of these designs, a same mechanical correction can be used. Such design overcomes difficulties with active feedback control in conventional devices where BL (or similarly, a conversion from control current $I_{supply}$ to force F) is calibrated by deadweights or with a known external force. The dynamic force contactor 200 is calibrated using Kibble's approach in situ, which makes dynamic force contactor 200 self-calibrating with a primary realization of a SI-traceable force.

The dynamic force contactor 200 provides Kibble balances for dynamic force metrology that provide primary dynamic forces directly to a system of interest. Uncertainties on the dynamic force output from dynamic force contactor 200 are smaller than conventional force standards. The dynamic force contactor 200 can be constructed at different scales for applications at various force amplitude scales. For dynamic force contactors 200 that have armatures and coils with sufficiently small mass, e.g., less than approximately 100 grams, bandwidths up to 10 kHz occur. For a one-Newton sinusoidal standard, uncertainties at the percent level or better occur.

Example 4. High-Bandwidth Kibble-Balance Dynamic Force Standard

Here, equations are numbered starting again with equation 1, and dynamic force contactor 200 is described as being a dynamic force standard based on principles of the Kibble (watt) balance. The dynamic force contactor 200 provides low-uncertainty traceable dynamic forces over a wide frequency range. The dynamic force contactor 200 determines force from simultaneous measurement of voltage, velocity and current. The dynamic force contactor 200 can operate with only a current measurement, based on a calibrated BL integral. For a dynamic force contactor 200 that produces a 10-newton force amplitude, an uncertainty below 1% can be achieved for operating frequencies exceeding 10 kHz. This dynamic force contactor 200 provides an accurately-known dynamic force for calibration of systems for measuring dynamic forces such as forces varying as fast as or faster than the settling time of the force measurement system.

The dynamic force contactor 200 generates SI-traceable forces up to high frequencies with uncertainties at or below the percent level. At this level of uncertainty, it is believed that measures and corrections taken in Kibble balances designed for extreme-accuracy measurements are unnecessary, and high operating frequency achieves percent-level uncertainty.

Traceable dynamic force standards are needed for calibrating and testing the accuracy of force measurements in a wide variety of applications, such as material testing, aerodynamic wind tunnel measurements, and automotive crash testing. Conventional primary standards are not easily applied to force measurement systems in the field. A dynamic sensitivity of an assembled force measurement system is not the same as that of the isolated force sensor, limiting the utility of external calibration of force sensors for dynamic force measurements. The dynamic force contactor 200 overcomes these problems and provides a portable dynamic force standard to calibrate force measurement systems in their operational installations. A conventional calibrated force sensor that can be struck against the force measurement system that is to be calibrated results in a common force applied to both devices, but this conventional device is a secondary standard because it must be traceably calibrated, allowing transfer of the calibration from a primary standard to a working system. In contrast, the dynamic force contactor 200 herein advantageously is a primary standard that can be used to directly calibrate so that it can be a secondary standard.

In Kibble balances, a mechanical force in balances designed to measure mass or Planck's constant this is typically the gravitational force is balanced by a Lorentz force $$\vec{F} = \oint_L \vec{B}(\vec{r}) \otimes I \vec{dl}(\vec{r}) d\vec{r} = I \boxed{BL}, \quad (1)$$

where I is the current flowing in a wire (usually in the form of a coil) of length L and differential length element $\vec{dl}$, immersed in magnetic field of flux density $\vec{B}$. The accurate determination of the value of this $\boxed{BL}$ integral is the main challenge in application of the Lorentz force law to accurate calibration, and Kibble evaluated this from the induced voltage U generated across the wire when it is moved at velocity V through the magnetic field, $$U = \vec{V} \cdot \oint_L \vec{B}(\vec{r}) \otimes \vec{dl}(\vec{r}) d\vec{r} = \vec{r} \cdot \vec{V}. \quad (2)$$

The dynamic force contactor 200 has an axial force component, e.g., the component present in a geometry. Thus, measuring voltage U, axial velocity component V and current I gives the axial force magnitude F according to $$F(t) = \frac{U(t)I(t)}{V(t)}, \quad (3)$$

where the time-dependence of the physical quantities has been explicitly indicated. At an angular frequency ω, $$\tilde{F}(\omega) = \frac{\tilde{U}(\omega)\tilde{I}(\omega)}{\tilde{V}(\omega)}. \quad (4)$$

where $\tilde{F}$, $\tilde{U}$, $\tilde{I}$ and $\tilde{V}$ are complex amplitudes. The dynamic force contactor 200 can operate based on these relations.

An alternative to using the dynamic force contactor 200 as a Kibble balance (i.e., using equation 3 or 4 of this Example) is to calibrate the $\boxed{BL}$ integral (e.g., using a static force measurement) and then use equation (1) with only a current measurement. Such a calibration can be performed at DC, using a statically calibrated force transducer or deadweights. While such a prior measurement of the $\boxed{BL}$ integral removes the need to make accurate measurements of voltage U and velocity V, it introduces effects of spatial variation of the $\boxed{BL}$ integral as a function of coil position and of temporal variation of the $\boxed{BL}$ integral due for example to the effect of temperature changes. Nevertheless, with dynamic force contactor 200 to provide a sufficiently spatially uniform $\boxed{BL}$ integral it can be an attractive mode of operation for force uncertainty at the 1% level. Attention is paid to Kibble balance operation, i.e., operation based on equations (3) and (4). Furthermore, sinusoidal force waveforms are involved, and the dynamic force contactor 200 can be a force calibration tool.

Table 1 provides values of device parameters and operating dynamic variables over the frequency range 10 Hz to 10 kHz for dynamic force contactor 200.

TABLE 1

| Quantity | Value |
|---|---|
| DEVICE PARAMETERS | |
| $\boxed{BL}$ Integral | 25 N/A |
| Armature Mass ($m_A$) | 41 g |
| Body Mass | 1.5 kg |
| Armature Stiffness ($k_a$) | $1.7 \times 10^8$ N/m |
| Armature Resonant Frequency | 9.4 kHz |
| Flexure Stiffness (K) | $3 \times 10^4$ N/m |
| Current Sense Resistance ($R_s$) | 10 Ω |
| Coil Wire Resistance (R) | 17 Ω |
| Resistance Difference Between 2 Coils (ΔR) | 0.005 R = 0.085 Ω |
| Coil Inductance ($\mathcal{L}$) | $1 \times 10^{-5}$ H + $(2\pi/\omega)^{0.6}$ 0.05 H · s |
| Inductance Difference Between 2 Coils (Δ$\mathcal{L}$) | 0.01 × $\mathcal{L}$ |
| Mechanical Damping Ratio | 0.01 |

TABLE 1-continued

| Quantity | Value |
|---|---|
| DYNAMIC VARIABLES | |
| Deployment Force Amplitude | 10N |
| Current Amplitude (I) | 0.4 A |
| Body Acceleration Amplitude ($a_b$) | 0.33 m/s$^2$ |
| Armature-Body Relative Velocity Amplitude (V) | $4.4 \times 10^{-6}$ m/s to 0.11 m/s |
| Armature-Body Relative Displacement amplitude ($x_{rel}$) | $4.6 \times 10^{-10}$ m to $8.3 \times 10^{-5}$ m |
| Armature Back EMF (U) | $1.1 \times 10^{-4}$ V to 2.8 V |
| Total Armature Voltage Drop ($U_{meas}$) | 0.034 V to 2.8 V |
| Resistive Voltage Drop Amplitude Across Each Coil | 0.68 V |
| Differential Resistive Voltage Drop Amplitude | 0.034 V |
| Current Sense Voltage Amplitude ($U_s$) | 4 V |
| Inductive Voltage Drop Amplitude Across Each Coil | 0.1 V |
| Differential Inductive Voltage Drop Amplitude | $1.3 \times 10^{-3}$ V to 0.06 V |

Figure 17:
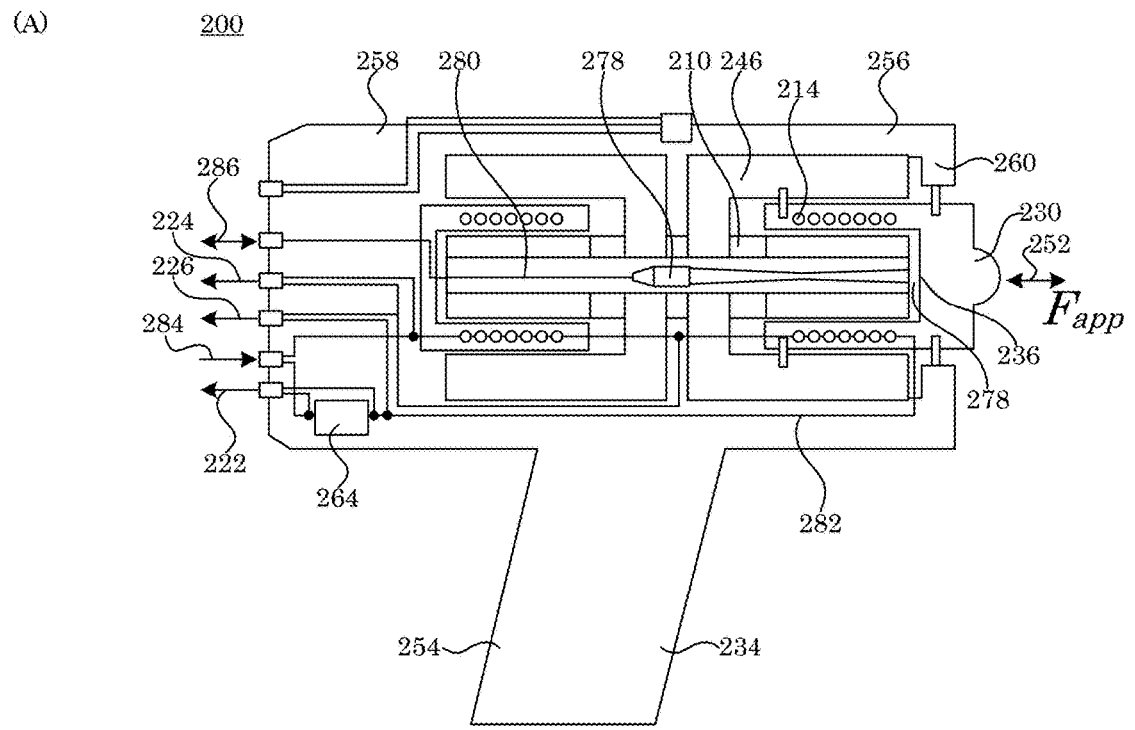
FIG. 17 shows a dynamic force contactor in panel A and dynamic force mediator in panel B.

An example design of dynamic force contactor 200 is shown in FIG. 17, and parameter values for dynamic force contactor 200 that generates 10 N are listed in Table 1. Here, dynamic force contactor 200 is a portable, hand-held traceable dynamic force for an exposed location on a system under test. The magnetic field is generated using a permanent magnet and guided by shaped pole-pieces. As discussed here, dynamic force contactor 200 provides simultaneous measurement of coil current I, coil velocity V, and induced voltage U. Current is measured with a calibrated sensing resistor; voltage is measured with a calibrated external voltmeter, and velocity is measured with a fiber-coupled Fabry-Perot interferometer. Additionally, an accelerometer measures absolute body acceleration used in calculating absolute armature acceleration and correction for inertia of the armature. The interferometer can be replaced by a second accelerometer or a velocity or displacement transducer.

A resistive and inductive voltage drops across the coil can occur. A bifilar coil can eliminate the resistive voltage drop but not the inductive voltage drop. While the resistive and induced voltages are 90 degrees out of phase, allowing phase-sensitive detection to separate them, the inductive voltage drop is 180 degrees out of phase with the induced voltage and not separable. The dynamic force contactor 200 can include two nominally identical coils with approximately equal resistances $R_{coil1}$, $R_{coil2}$ and approximately equal inductances $\mathcal{L}_{coil1}$, $\mathcal{L}_{coil2}$. The two coils are arranged in series so that the same current flows through each coil, resulting in approximately equal resistive and inductive voltage drops. Coil 1 is disposed proximate to the armature of, is suspended by flexures, and oscillates under action of Lorentz force on the current in the radial magnetic field, developing induced voltage U. Coil 2 is fixed and develops no induced voltage. Thus, the inductive and resistive voltage drops across the coils are largely cancelled by a differential measurement, leaving the induced voltage drop across coil 1.

The induced voltage U is related to the measured voltage $U_{meas}$ by $$U = U_{meas} - \Delta U_R - \Delta U_{\mathcal{L}}, \tag{5}$$

and the applied force F is related to the coil current I and measured voltage $U_{meas}$ by $$F_{app} = \frac{I}{V}(U_{meas} - \Delta U_R - \Delta U_{\mathcal{L}}) - F_{inet} - F_{par}, \tag{6}$$

wherein $\Delta U_R = I(R_{coil1} - R_{coil2})$ is the residual resistive voltage drop; $\Delta U_{\mathcal{L}} = i2\pi f I(\mathcal{L}_{coil1} - \mathcal{L}_{coil2})$ is the residual inductive voltage drop at excitation frequency f; $F_{inet}$ is the force required to accelerate the armature inertia, and $F_{par}$ is the parasitic force applied to the armature by support flexures, connected wires, and air drag.

The coils are subjected to matched radial fields, achieved by symmetrical construction and selection of matched permanent magnets; the application of the radial field to the second inductor is done in order to match the operating points on the nonlinear permeability curves of the inductor cores. Furthermore, the coils are mounted together in the housing of dynamic force contactor 200, which minimizes temperature differences between the two core assemblies and which would otherwise create differential magnetization of the permanent magnets and permeability of the cores. Alternatively, the second coil could be disposed external to dynamic force contactor 200 and connected to dynamic force contactor 200 by a cable.

An electrical model of dynamic force contactor 200 is shown in FIG. 17(*b*). The excitation current I is supplied by a current source. $I_1$ and $I_2$ are the currents flowing in coils 1 and 2 respectively, and $R_L$, $\mathcal{L}_L$ and $C_L$ represent "lead" resistance, inductance and capacitance respectively. The resistances $R_1$ and $R_2$ of the two coils are due to ohmic resistance in the coil wire and to losses in the pole pieces and permanent magnets due to eddy currents and magnetization hysteresis. Capacitances $C_1$ and $C_2$ are parasitic capacitances across each coil. Component values in the model are in frequency-dependent quantities. The measured differential voltage drop across the coils is $$U_{meas} = U + I\left[\left(i\omega C_1 + \frac{1}{R_1 + i\mathcal{L}_1\omega}\right)^{-1} - \left(i\omega C_2 + \frac{1}{R_2 + i\mathcal{L}_2\omega}\right)^{-1}\right] = U + I\Delta Z, \tag{7}$$

wherein $\Delta Z$ is the impedance difference between the coils and $i = \sqrt{-1}$. In the limit that $C_1$ and $C_2$ go to zero, $\Delta Z$ reduces to $\Delta R + i\omega \Delta L$ where $\Delta R \equiv R_2 - R_1$ and $\Delta \mathcal{L} \equiv \mathcal{L}_2 - \mathcal{L}_1$. In practice, a process for calibrating the impedance difference $\Delta Z(\omega)$ includes holding coil 1 fixed (in addition to coil 2) so that U=0 V, for which case $\Delta Z = U_{meas}/I$. If temporary clamping of coil 1 is less rigid than the permanent fixation of coil 2, a small current value can be used in this calibration to minimize motion of coil 1 due to deformation of the clamping mechanism. The capacitances across the coils result in a difference between the current $I_1$ in coil 1, which generates the force F, and the total (measured) current I $$I_1 = I\frac{1}{1 + i\omega C_1(R_1 + i\omega \mathcal{L}_1)}, \tag{8}$$

and in a difference between the currents in the two coils, $I_1$ and $I_2$, $$I_1 - I_2 = I\left[\frac{1}{1+i\omega C_1(R_1+i\omega\mathcal{L}_1)} - \frac{1}{1+i\omega C_2(R_2+i\omega\mathcal{L}_2)}\right] \approx \quad (9)$$
$$i\omega I[C_2(R_2+i\omega\mathcal{L}_2) - C_1(R_1+i\omega\mathcal{L}_1)].$$

With calibration of $\Delta Z(\omega)$, which includes the capacitances $C_1$ and $C_2$, this current difference is not a source of error in the determination of U. However, capacitances $C_1$, $C_2$, and $C_L$ introduce error into the measurement of the force-generating current $I_1$. Additionally, $\mathcal{L}_L$ will introduce a (frequency-dependent) phase offset between the measured current I and the force generating current $I_1$. For the remainder of this Example, neglect capacitances and $\mathcal{L}_L$ such that Equation (6) becomes $$U_{meas} = U + I(\Delta R + i\omega\Delta\mathcal{L}). \quad (10)$$

Figure 18:
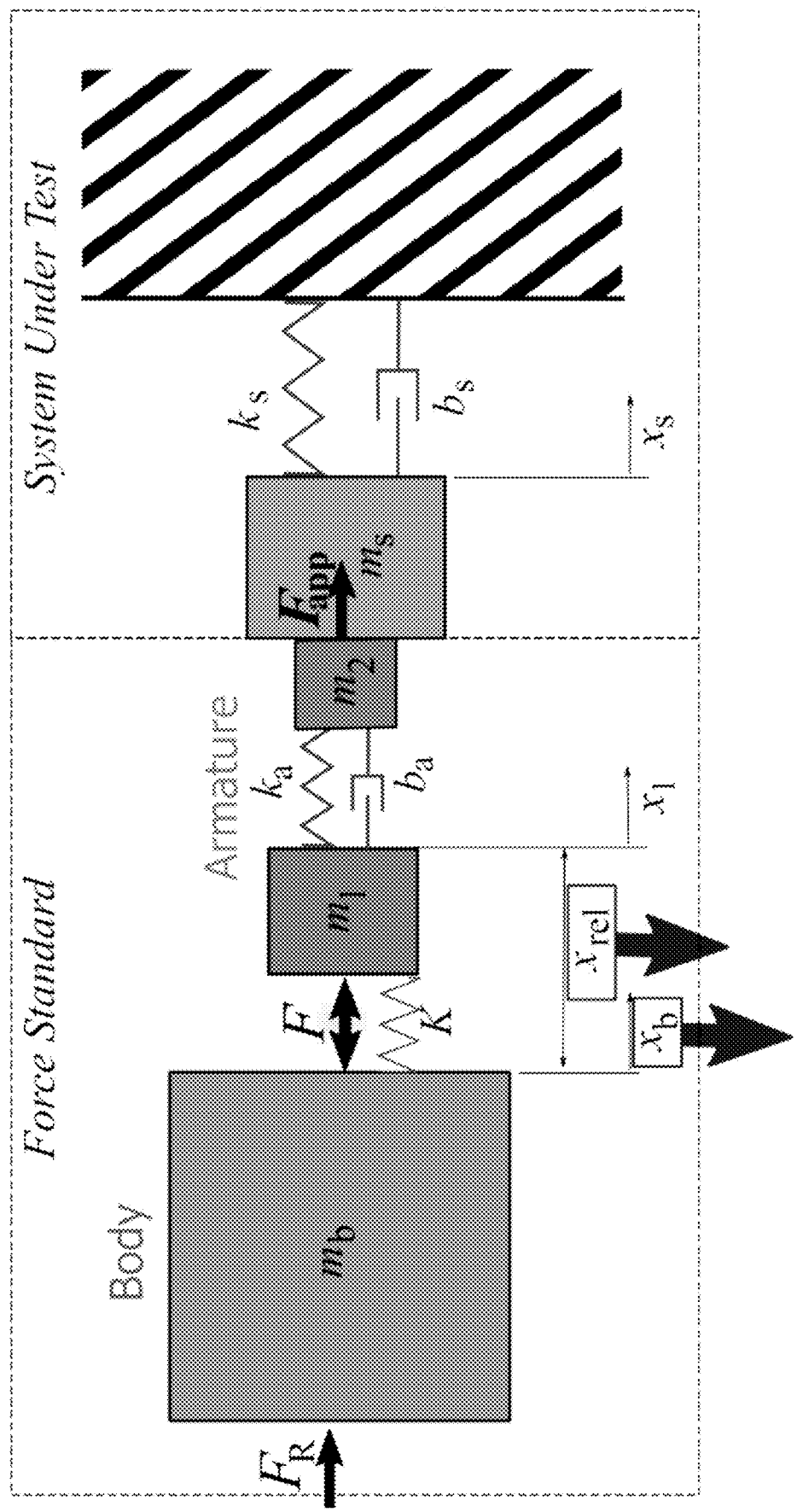
FIG. 18 shows a mechanical model of a dynamic force contactor.

Mechanical behavior of dynamic force contactor 200 can be determined by the mechanical system to which it is coupled, e.g., a system under test (SUT). A mechanical model of the device coupled to an SUT with an internal degree of freedom is shown in FIG. 18. Deformability of the armature and of the SUT are modeled by single degree of freedom mass-spring-dampers. The body of the device is modeled by a lumped mass supported by restraining force $F_R$. This model considers that the device is rigidly coupled to the SUT. The armature is supported by flexures of total stiffness K, which exert a parasitic restraining force on the armature. Other sources of parasitic force include finite stiffness of the wires connecting to the coils, and aerodynamic drag. The directly measured motions in the device are the motion of the body relative to an inertial reference frame ($x_b$ in FIG. 18) and the motion of the armature relative to the body of the device ($x_{rel} = x_b - x_1$ in FIG. 18).

A number of degrees of freedom of SUT may vary from zero up to tens or higher, and quantitative mechanical properties (e.g., mode resonant frequencies and quality factors) can vary from one SUT to another. The model shown in FIG. 18 is sufficient for design and the uncertainties of measured quantities to achieve a low-uncertainty force output within range of SUT mechanical parameters.

The equations of motion for $x_s$, the displacement of the SUT, $x_1$, the displacement of the armature, and $x_b$, the displacement of the device body, are $$m_1\ddot{x}_1 + b_a(\dot{x}_1 - \dot{x}_s) + k_a(x_1 - x_s) = F \quad (11)$$

$$(m_2+m_s)\ddot{x}_s - b_a(\dot{x}_1 - \dot{x}_s) + b_s\dot{x}_s - k_a(x_1 - x_s) + k_s x_s = 0 \quad (12)$$

$$m_b\ddot{x}_b = F_R - F \quad (13)$$

Solving these in the frequency domain gives $$\frac{X_s(\omega)}{F(\omega)} = \frac{1}{m_1} \frac{\omega_a^2 + 2i\zeta_a\omega_a\omega}{[-(\eta_1+\eta_2)\omega^2 + (\omega_a^2+2i\zeta_a\omega_a\omega) + \eta_2(\omega_s^2+2i\zeta_s\omega_s\omega)]} \quad (14)$$
$$[-\omega^2 + \omega_a^2 + 2i\zeta_a\omega_a\omega] - [\omega_a^2 + 2i\zeta_a\omega_a\omega]^2$$

$$\frac{X_1(\omega)}{F(\omega)} = \frac{1}{m_1} \frac{-(\eta_1+\eta_2)\omega^2 + (\omega_a^2+2i\zeta_a\omega_a\omega) + \eta_2(\omega_s^2+2i\zeta_s\omega_s\omega)}{[-(\eta_1+\eta_2)\omega^2 + (\omega_a^2+2i\zeta_a\omega_a\omega) + \eta_2(\omega_s^2+2i\zeta_s\omega_s\omega)]} \quad (15)$$
$$[-\omega^2 + \omega_a^2 + 2i\zeta_a\omega_a\omega] - [\omega_a^2 + 2i\zeta_a\omega_a\omega]^2$$

$$\frac{X_b(\omega)}{F(\omega)} = -\frac{F_R(\omega)/F(\omega) - 1}{m_b\omega_b^2} \quad (16)$$

with $$\omega_a \equiv \sqrt{\frac{k_a}{m_1}}, \omega_s \equiv \sqrt{\frac{k_s}{m_s}}, \zeta_a \equiv \frac{b_a}{2\sqrt{k_a m_1}}, \zeta_s \equiv \frac{b_s}{2\sqrt{k_s m_s}}, \quad (17)$$
$$\eta_1 \equiv \frac{m_2}{m_1}, \eta_2 \equiv \frac{m_s}{m_1}.$$

Figure 19:
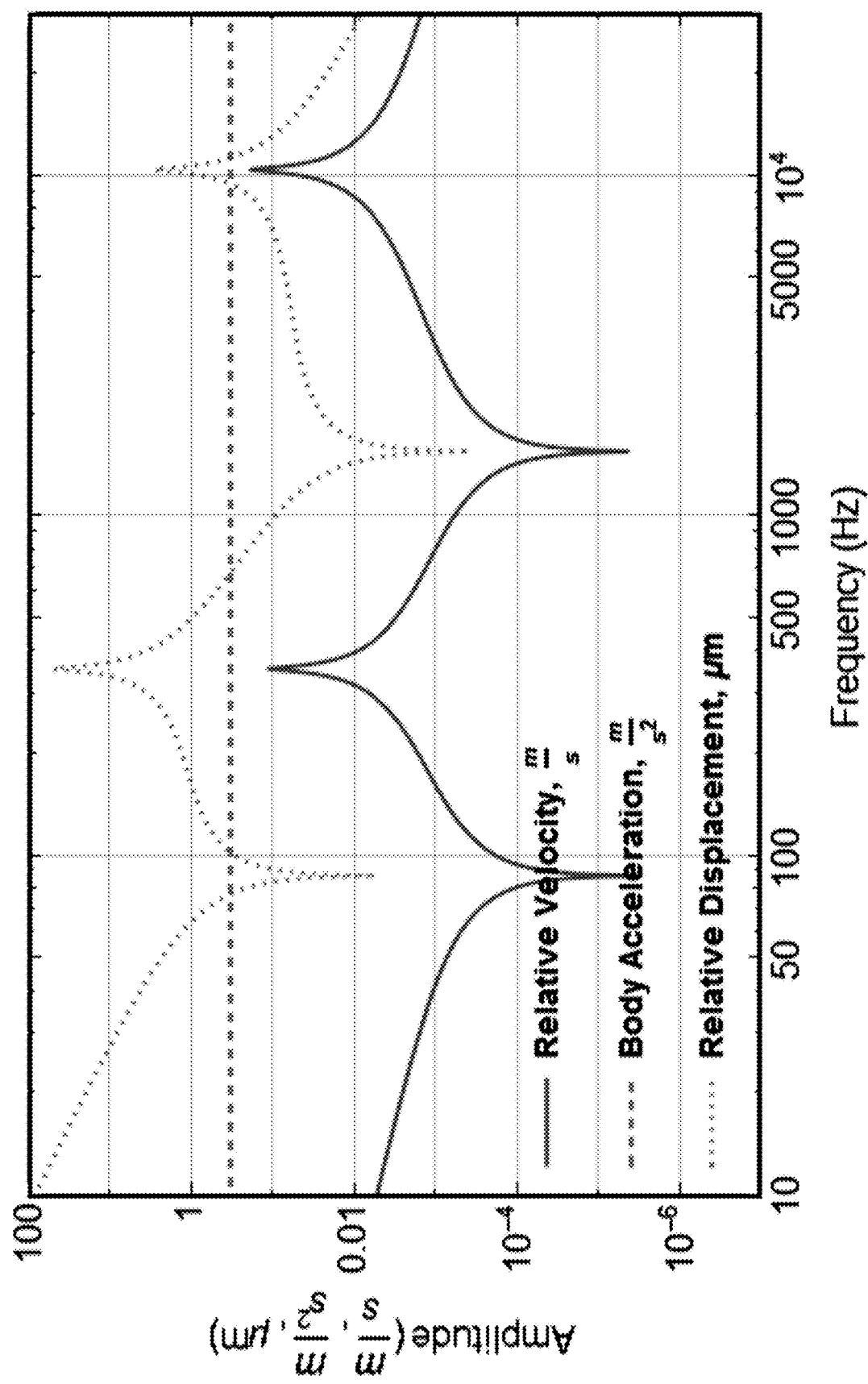
FIG. 19 shows a graph of amplitude versus frequency for a dynamic force contactor.

FIG. 19 shows dynamics of dynamic force contactor 200, as given by equations (14-17), for a sinusoidal Lorentz force of amplitude 10 N. The SUT mode stiffness $k_s$ is $10^7$ N/m, and the mass $m_s$ is 2 kg. The lumped masses $m_1$ and $m_2$ of the armature are 40 g and 1.25 g respectively, and the armature stiffness $k_a$ is $1.7\times10^8$ N/m. The armature parameters are based on a designed beryllium armature with an aluminum wire coil. The damping ratios and of the armature and SUT modes are 0.01. The mass $m_b$ of the device body is 1.5 kg, and the restraining force $F_R$ is 95% of the force applied to it by the magnetic field, i.e., a sinusoidal force of amplitude 9.5 N.

The quantities plotted in FIG. 19 are the relative displacement and velocity of the armature ($m_1$) with respect to the body of the device, as well as the absolute acceleration of the body. A resonant frequency is at 350 Hz due to the SUT degree of freedom and a resonant frequency at 10 kHz due to armature internal degree of freedom. Intermediate between the two resonances is an antiresonance in the armature motion and in the relative motion between the armature and to the body at nearly the same frequency. The relative velocity can be below 0.1 m/s and can exclude the immediate vicinity of antiresonances down to $10^{-5}$ m/s, involving a dynamic range of $10^6$ for 1% uncertainty. At the lower resonance frequency, the relative armature-body displacement reaches 50 μm that is larger with lower frequency or more lightly damped resonances. With the model used for the body support condition, the body acceleration amplitude is 0.13 m/s².

Figure 20:
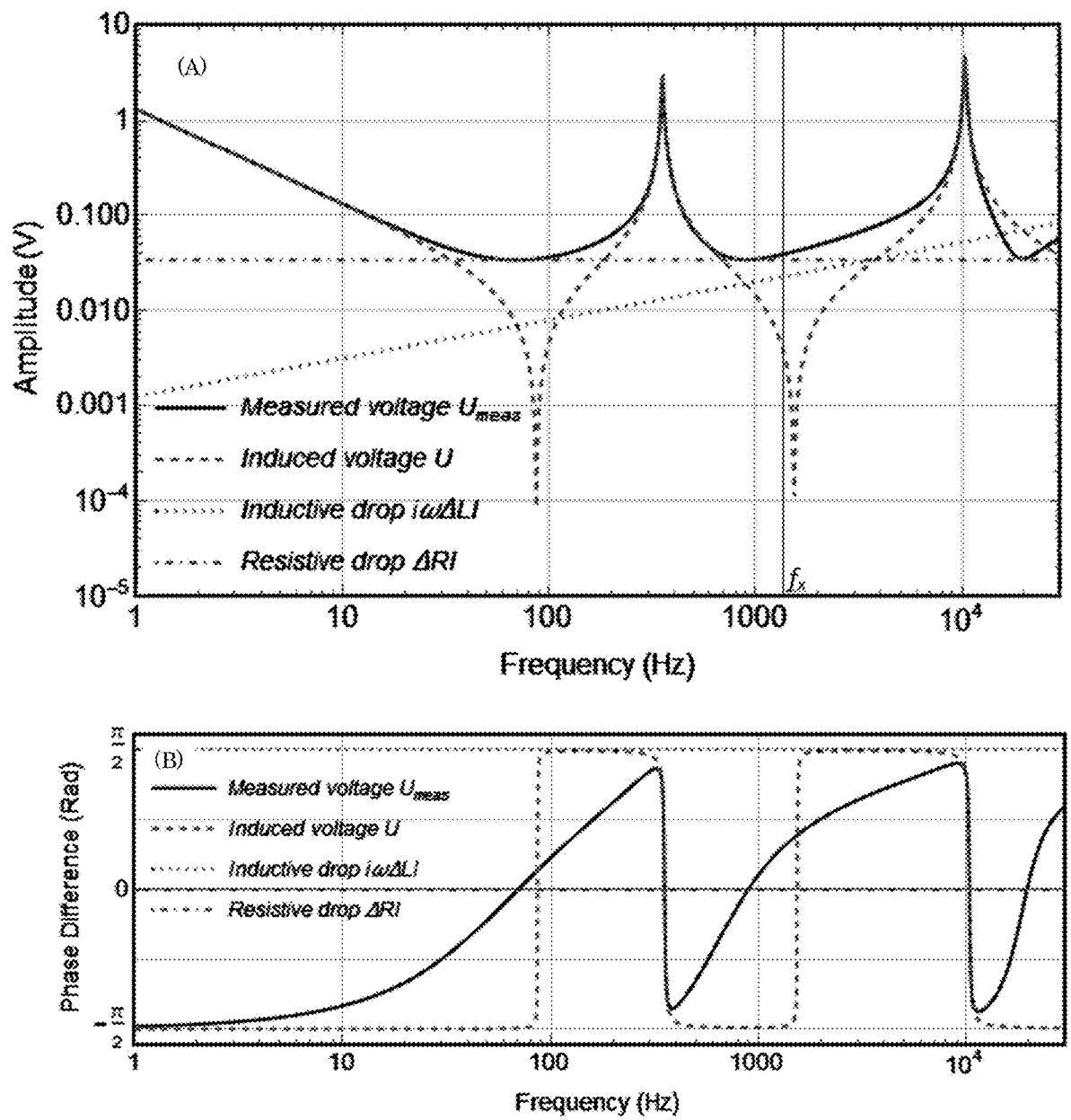
FIG. 20 shows a graph of amplitude versus frequency for a dynamic force contactor in panel A and a graph of phase difference versus frequency in panel B.

The induced voltage U is proportional to the relative velocity V (equation (2)) plotted in FIG. 20(*a*). Also plotted are amplitudes of the residual resistive and inductive voltage drops and the total measured voltage $U_{meas}$. These residual voltage drops are remaining voltages after cancellation between two matched coils. The inductances are modeled as having a $1/f^{0.6}$ dependence, which are approximate for off-the-shelf voice coils. The resistance of the coils is modeled as frequency-independent. The coils differ in resistance and inductance by 0.5% and 1%, respectively. Residual resistive drop is larger than induced voltage U for some of the operating frequency range. At the frequency labeled $f_x$, the residual resistive voltage drop $I\Delta R$ exceeds U by a factor of 10. At this same frequency, the residual inductive voltage drop is equal in magnitude to 0.68 U.

In FIG. 20(*b*), the phases of the different voltage terms with respect to the excitation current I (and thus the Lorentz force F) are shown. From equation (5), using the constant phases (0, π/2) of $\Delta U_R$ and $\Delta U_\lambda$, the amplitude of U is given by $$|U| = \sqrt{\frac{|U_{meas}|^2 + |\Delta U_R|^2 + |\Delta U_L|^2 -}{2|U_{meas}|[|\Delta U_R|\cos(\varphi_{meas}) + |\Delta U_L|\cos(\varphi_{meas} - \pi/2)]}}, \quad (18)$$

wherein $\varphi_{meas}$ is the phase of $U_{meas}$. Alternatively, since U and velocity V are in phase, $$|U| = |U_{meas}|(e^{i(\varphi_{meas}-\varphi_V)}) - |\Delta U_R|e^{-i\varphi_V} - |\Delta U_L|e^{i(\frac{\pi}{2}-\varphi_V)}, \quad (19)$$

wherein $\varphi_V$ is the phase of the measured velocity. Thus, determining the amplitude of U requires (equation 18) knowing the phase of $U_{meas}$ with respect to the current I, or (equation 19) knowing the phases of $U_{meas}$ and V with respect to the current I. This would be provided for example by synchronous sampling of $U_{meas}$ and I (and V in the case of equation (19)).

The expressions for the phase $\varphi_U$ of U corresponding to equations (18) and (19) respectively are $$\varphi_U = \text{Atan}\left(\frac{|U_{meas}|\sin\varphi_{meas} - |\Delta U_L|}{|U_{meas}|\cos\varphi_{meas} - |\Delta U_R|}\right) \quad (20)$$

and $$\varphi_U = \varphi_V. \quad (21)$$

The equality of the right-hand sides of equations (20) and (21) can be used as a check of the accuracy of measurements and validity of assumptions. Equivalently to (21), the total phase of the right-hand side of equation (19) should be zero.

At sharp anti-resonances in the body-armature relative motion, the relative velocity and induced voltage vanish, and large uncertainties result from using the fully in-situ Kibble balance method. At such operating points the force can be determined by the "quasi in-situ" approach of extracting the $\boxed{BL}$ integral (using equations 2 and 5) from the measurements of current, velocity and voltage at other frequencies, and then using equation 1 to determine the force at and around the antiresonance, with an uncertainty contribution from the possible variation of the effective $\boxed{BL}$ integral with operating point.

Extracting the amplitude of the induced voltage U from the amplitude of the measured voltage $U_{meas}$ requires a phase measurement, the minimum requirement being a measurement of $\varphi_{meas}$, the phase of the measured voltage relative to the excitation current. In a force calibration of a SUT, it will often be desired to know the phase of an output signal from the SUT with respect to the force $F_{app}$ applied to it. It may appear that to determine the Lorentz force F (amplitude and phase) applied to the armature by the magnetic field using equation (3) or (4), that the relative phases of U, I and V must be measured. However, since the current I is in phase with F, and the induced voltage U is in phase with the relative velocity V, $|F|=|UI/V|=|U||I|/|V|$ and only the amplitudes of the three input quantities are measured to give the amplitude of F. The phase of F (with respect to the current I) is zero. To determine the force $F_{app}$ applied to the SUT, corrections to F for the armature inertia and parasitic forces are applied as indicated by equation (6), and these will in general include a phase correction.

In addition to measuring the phase of $U_{meas}$ with respect to the excitation current, additional phase measurement in determining the phase response of the SUT output signal is that of the SUT output signal with respect to the excitation current. Analytical knowledge of the phase difference between F and $F_{app}$ can occur at some frequencies.

Figure 21:
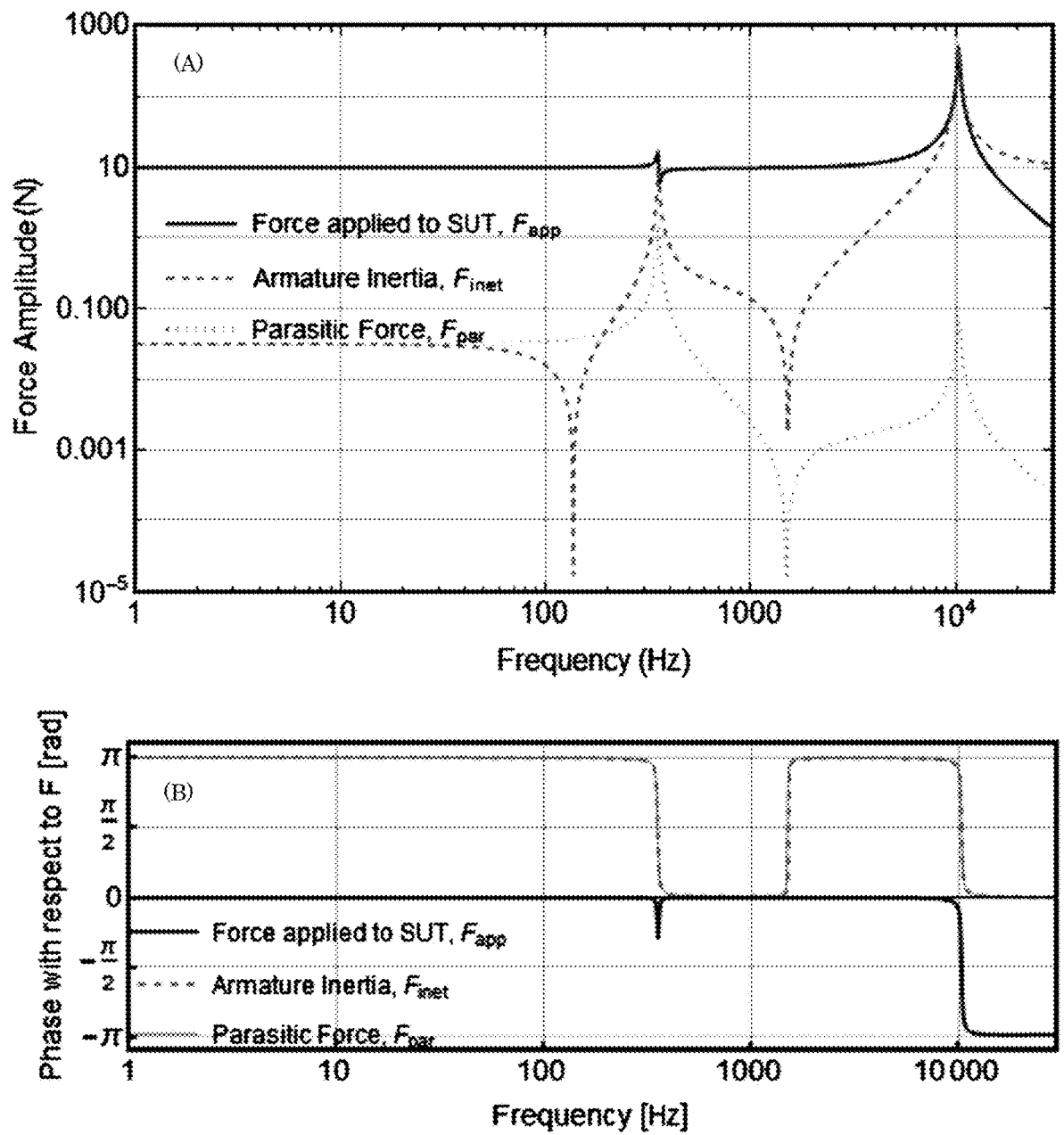
FIG. 21 shows a graph of force amplitude versus frequency for a dynamic force contactor in panel A and a graph of phase versus frequency in panel B.

FIG. 21 shows the force $F_{app}$ applied to SUT, assuming that the device is operated with a 10 N amplitude Lorentz force F. In the vicinity of resonances, the deviation in the amplitude and phase of $F_{app}$ from F due to the armature inertia is significant. Away from such resonances, the phase of $F_{app}$ tracks that of F closely. At frequencies above the armature resonance at ≈10 kHz, the Lorentz force goes predominantly into the armature inertia and little force is applied to the SUT. In this region the uncertainty in the applied force using equation (6) is dominated by uncertainty in the armature inertia $F_{inet}$. The parasitic force is modeled as being due to a restraining stiffness of $3\times10^4$ N/m (predominantly due to support flexures), and is insignificant.

A location of resonant features can vary from one SUT to another. The achieved force uncertainty as a function of frequency can dependent on mechanical properties of the SUT can be determined in the calibration as a function of the electrical and mechanical measurements made.

With regard to uncertainty, equation (6) is repeated here as equation (22) for convenience.

$$F_{app} = \frac{I}{V}(U_{meas} - \Delta U_R - \Delta U_L) - F_{inet} - F_{par} \quad (22)$$

Quantities measured during operation of dynamic force contactor 200 include voltage $U_{meas}(t)$ across the coils, voltage $U_s(t)$ across a current-measuring shunt resistance, relative velocity $V(t)$ of the armature with respect to the body, acceleration $a_B(t)$ of the body, and operating frequency $\omega$. Quantities that are characterized offline are the residual differential resistance $\Delta R$ and inductance $\Delta \mathcal{L}$, the current-measuring shunt resistance $R_S$, the armature and body masses $m_1$, $m_2$ and $m_b$, and the stiffness K of the armature support flexures. The current I(t) is determined as $I=U_s/R_s$. The inertial offset $F_{inet}(t)$ due to the armature acceleration is determined as $F_{inet}=m_1 a_1+m_2 a_2=m_1(i\omega V+a_B)-m_2\omega^2 X_S(\omega)$. The parasitic restoring force of the flexures is calculated as K X(t), where the relative displacement X(t) of the armature with respect to the body is determined as $X(t)=V(t)/\omega$. We do not correct for additional parasitic forces (e.g. due to wires and air), but treat these as an uncertainty $\delta F_{par2}$ equal to an estimated upper bound for such forces. Rewriting the measurement equation in terms of these quantities gives $$F_{app} = \frac{U_S U_{meas}}{V R_S} - \frac{U_S U_{meas}^2}{V R_S^2}(\Delta R + i\omega\Delta\mathcal{L}) - \quad (23)$$
$$[m_1(i\omega V + a_B) - m_2\omega^2 X_S] - \frac{K}{\omega}V.$$

Assuming these measurements to be uncorrelated, the uncertainty in the applied force is given as $$\delta F_{app}^2 = \left(\frac{\partial F_{app}}{\partial V}\right)^2 \delta V^2 + \left(\frac{\partial F_{app}}{\partial U_{meas}}\right)^2 \delta U_{meas}^2 + \left(\frac{\partial F_{app}}{\partial U_s}\right)^2 \delta U_s^2 + \quad (24)$$
$$\left(\frac{\partial F_{app}}{\partial a_B}\right)^2 \delta a_B^2 + \left(\frac{\partial F_{app}}{\partial \omega}\right)^2 \delta\omega^2 + \left(\frac{\partial F_{app}}{\partial \Delta R}\right)^2 \delta\Delta R^2 +$$
$$\left(\frac{\partial F_{app}}{\partial \Delta\mathcal{L}}\right)^2 \delta\Delta\mathcal{L}^2 + \left(\frac{\partial F_{app}}{\partial R_s}\right)^2 \delta R_s^2 + \left(\frac{\partial F_{app}}{\partial m_1}\right)^2 \delta m_1^2 +$$
$$\left(\frac{\partial F_{app}}{\partial m_2}\right)^2 \delta m_2^2 + \left(\frac{\partial F_{app}}{\partial X_S}\right)^2 \delta X_S^2 + \left(\frac{\partial F_{app}}{\partial K}\right)^2 \delta K^2 + \delta F_{par2}^2$$

Figure 22:
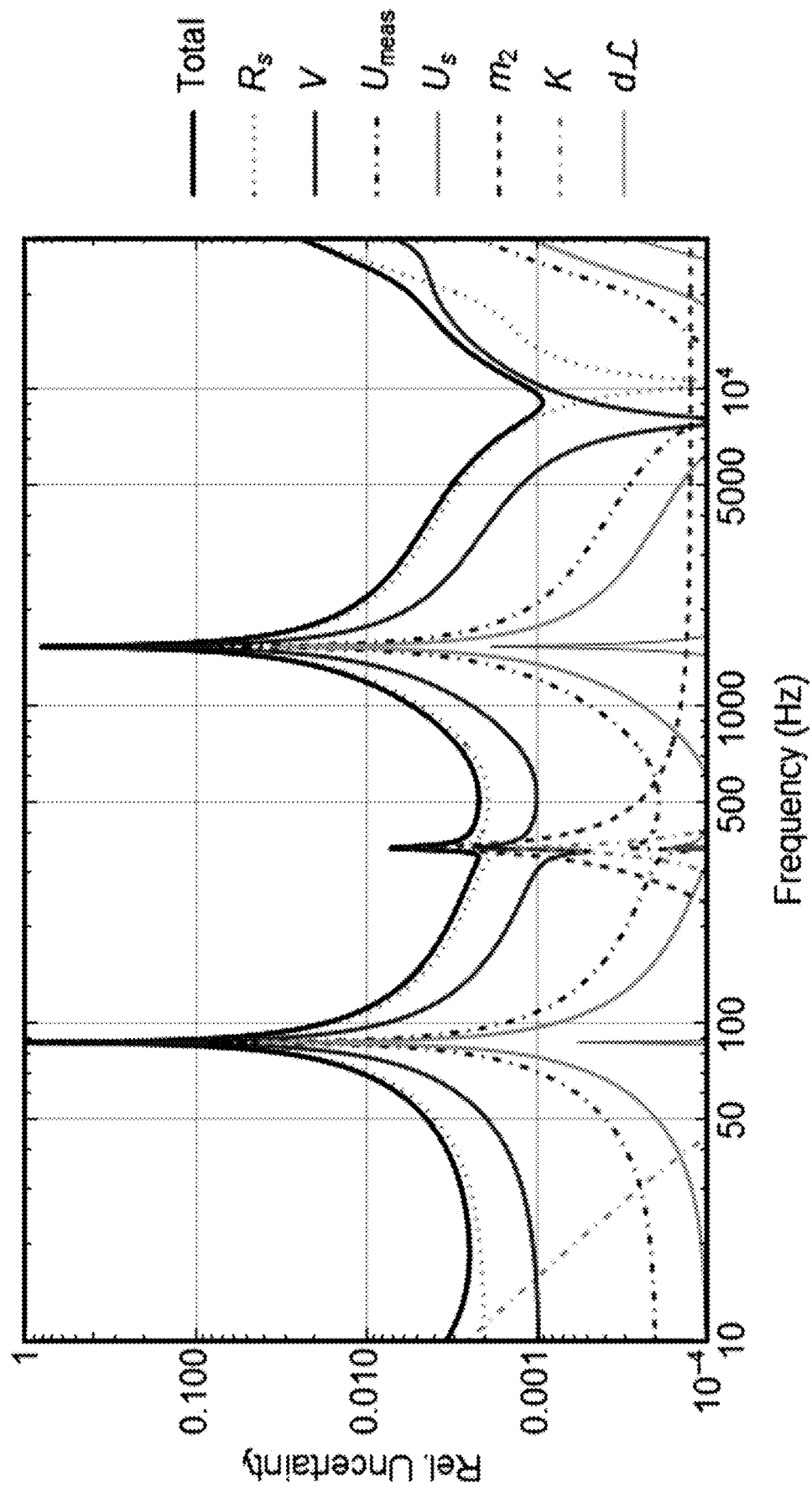
FIG. 22 shows a graph of relative uncertainty versus frequency for a dynamic force contactor.

In operation of dynamic force contactor 200, $X_S(\omega)$ can be calculated from a model ($X_1(\omega)$ is determined from the measured $V(\omega)$ and $a_B(\omega)$, to which the modeled $X_S(\omega)-X_1(\omega)$ given by equations (14) and (15) is added). Thus $\delta X_S$ in equation (24) has many contributions. The second column of Table 2 lists expressions for sensitivity coefficients in equation (22), and the third column of Table 2 lists a range of the corresponding force uncertainty contributions for the system modeled. FIG. 22 shows uncertainty contributions and overall uncertainty as a function of frequency. From 10 Hz to 20 kHz, the combined uncertainty is less than 1% except for frequencies near antiresonances at 80 Hz and 1.5 kHz. At these frequencies, it may be advantageous to determine the force based on a quasi in-situ calibrated BL integral rather than from equation (6). The anti-resonance at 1.5 kHz is due to the internal mode of the SUT, and the location and number of such features will vary from one SUT to another.

tance, this uncertainty contribution can be lowered by operating the device at a higher force level, and hence a higher relative velocity V.

The dynamic force contactor 200 is a high-bandwidth force standard that can be coupled to working force measurement systems. Although an exemplary 10 N force amplitude was used in this Example, dynamic force contactor 200 can operate at other frequencies, e.g., up to ~10 kHz, and dynamic force contactor 200 can be sized for different force amplitudes and frequency ranges. It is contemplated that dynamic force contactor 200 can be disposed temporarily or permanently into a mechanical system, e.g., a body that is rigidly-coupled into the mechanical system in which the force measurement is being made. Although this Example describes operation of dynamic force contactor 200 at a

TABLE 2

| Quantity (X) | Relative uncertainty of Quantity $\left(\frac{\delta X}{X}\right)$ | Sensitivity Coefficient $\left(\frac{\partial F_{app}}{\partial X}\right)$ | Contribution to Force Rel. Uncertainty $\left\|\frac{1}{F_{app}}\left(\frac{\partial F_{app}}{\partial X}\right)\partial X\right\|$, over range 10 Hz to 10 kHz |
|---|---|---|---|
| $R_s$ | $2 \times 10^{-3}$ | $\partial F_{app}/\partial R_S = -\frac{U_S U_{meas}}{V\, R_S^2} + \frac{2 U_S U_{meas}^2}{V\, R_S^3}(\Delta R + i\omega\Delta\mathcal{L})$ | $1.5 \times 10^{-4}$ to $9 \times 10^{-1}$ |
| V | $1 \times 10^{-3}$ | $\partial F_{app}/\partial V = -\frac{1}{V^2}\left[\frac{U_S U_{meas}}{R_S} - \frac{U_S U_{meas}^2}{R_S^2}(\Delta R + i\omega\Delta\mathcal{L})\right] - i\omega m_1 - \frac{K}{\omega}$ | $9 \times 10^{-5}$ to $4.5 \times 10^{-1}$ |
| $U_{meas}$ | $2 \times 10^{-4}$ | $\partial F_{app}/\partial U_{meas} = \frac{U_S}{V R_S} - \frac{2 U_S U_{meas}}{V R_S^2}(\Delta R + i\omega\Delta\mathcal{L})$ | $1.5 \times 10^{-5}$ to $9 \times 10^{-2}$ |
| $U_s$ | $1 \times 10^{-4}$ | $\partial F_{app}/\partial U_S = \frac{U_{meas}}{V R_S} - \frac{U_{meas}^2}{V R_S^2}(\Delta R + i\omega\Delta\mathcal{L})$ | $1 \times 10^{-5}$ to $4.5 \times 10^{-2}$ |
| $m_2$ | $2 \times 10^{-1}$ | $\partial F_{app}/\partial m_2 = \omega^2 X_S$ | $1 \times 10^{-7}$ to $8 \times 10^{-3}$ |
| K | $1 \times 10^{-2}$ | $\partial F_{app}/\partial K = -\frac{V}{\omega}$ | $<10^{-8}$ to $2.5 \times 10^{-3}$ |
| $\Delta\mathcal{L}$ | $2 \times 10^{-2}$ | $\partial F_{app}/\partial\Delta\mathcal{L} = -i\frac{U_S U_{meas}^2 \omega}{V R_S^2}$ | $1.5 \times 10^{-6}$ to $2 \times 10^{-3}$ |
| $m_1$ | $7 \times 10^{-4}$ | $\partial F_{app}/\partial m_1 = -(i\omega V + a_B)$ | $1.2 \times 10^{-8}$ to $8 \times 10^{-4}$ |
| $\Delta R$ | $5 \times 10^{-3}$ | $\partial F_{app}/\partial\Delta R = -\frac{U_S U_{meas}^2}{V R_S^2}$ | $2 \times 10^{-6}$ to $7 \times 10^{-4}$ |
| $X_S$ | $1 \times 10^{-3}$ to $5 \times 10^{-2}$ | $\partial F_{app}/\partial X_S = m_2 \omega^2$ | $<10^{-8}$ to $3 \times 10^{-5}$ |
| $a_B$ | $1 \times 10^{-2}$ | $\partial F_{app}/\partial a_B = -m_1$ | $2 \times 10^{-6}$ to $2 \times 10^{-5}$ |
| $F_{par2}$ | 1 | $\partial F_{app}/\partial F_{par2} = 1$ | $5 \times 10^{-7}$ to $8 \times 10^{-6}$ |
| $\omega$ | $1 \times 10^{-6}$ | $\partial F_{app}/\partial\omega = -i\frac{U_S U_{meas}^2 \Delta\mathcal{L}}{V R_S^2} - m_A V + \frac{K}{\omega^2}V$ | $<10^{-8}$ to $1 \times 10^{-6}$ |

The largest contribution to the force uncertainty over most of the frequency range 10 Hz to 10 kHz is due to the uncertainty in the sensing resistance used to measure the current. The uncertainty in this resistance is estimated as 0.2%, including the effects of temperature-sensitivity of the resistance. Apart from reducing the uncertainty of the resisfixed Lorentz force amplitude, achieved by holding the excitation current amplitude fixed, alternatively, a different quantity could be held constant. Feedback from SUT acceleration to the supply current could be used to keep the SUT displacement amplitude constant to avoid damage.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A dynamic force contactor to provide a dynamic force, the dynamic force contactor comprising: a magnet that provides a magnetic field; an electrical conductor that communicates an alternating current perpendicular to the magnetic field, the alternating current from the electrical conductor in combination with the magnetic field from the magnet providing a Lorentzian force; an armature disposed proximate to the magnet, the electrical conductor disposed on the armature such that the armature reciprocates in a reciprocating direction relative to the magnet in response to the Lorentzian force and that produces the dynamic force; and a dynamic force mediator in communication with the electrical conductor and the armature such that: the dynamic force mediator monitors an alternating voltage across the electrical conductor; the dynamic force mediator monitors an alternating current through the electrical conductor; and the dynamic force mediator monitors a reciprocation velocity of the armature.

2. The dynamic force contactor of claim 1, further comprising a housing on which the magnet, the electrical conductor, the armature, and the dynamic force mediator are disposed.

3. The dynamic force contactor of claim 1, further comprising an accelerometer disposed on the armature.

4. The dynamic force contactor of claim 1, further comprising a light source disposed on the armature or the housing, such that the light source provides light to monitor the reciprocation velocity of the armature.

5. The dynamic force contactor of claim 1, further comprising a light detector disposed on the armature or the housing, such that the light detector receives light from a light source and monitors the reciprocation velocity of the armature.

6. The dynamic force contactor of claim 1, further comprising a secondary electrical conductor disposed opposing the electrical conductor such that the magnet is interposed between the second electrical conductor and the electrical conductor.

7. The dynamic force contactor of claim 6, further comprising a secondary magnet disposed opposing the electrical conductor such that the magnet is interposed between the secondary magnet and the electrical conductor.

8. The dynamic force contactor of claim 7, wherein the secondary magnet is interposed between the magnet and the secondary electrical conductor.

9. The dynamic force contactor of claim 7, wherein the secondary electrical conductor is interposed between the magnet and the secondary magnet.

10. The dynamic force contactor of claim 7, further comprising a coupler in mechanical communication with and interposed between the secondary electrical conductor and the armature.

11. The dynamic force contactor of claim 1, further comprising a magnetic field guide disposed proximate to the magnet and that provides a selected shape of the magnetic field.

12. The dynamic force contactor of claim 1, further comprising an armature guide disposed proximate to the armature and that provides a linear motion in the reciprocating direction of the armature.

13. The dynamic force contactor of claim 1, wherein the dynamic force mediator produces a dynamic force signal based on the reciprocation velocity, the alternating voltage, and the alternating current.

14. The dynamic force contactor of claim 1, wherein the reciprocation velocity, the alternating voltage, and the alternating current are measured to be traceable to International System of Units (SI, abbreviated from French language Systeme international (d'unités)).

15. A process for providing a dynamic force, the process comprising: disposing the armature of the dynamic force contactor of claim 1 in contact with a structure to which the dynamic force is applied; providing electrical power to the electrical conductor, the electrical power comprising a time-varying amplitude; and reciprocating the armature at the reciprocation velocity in response to providing electrical power to the electrical conductor to provide the dynamic force to the structure.

16. A process for calibrating a force sensor to be traceable to the international system of units (SI), the process comprising: disposing the armature of the dynamic force contactor of claim 1 in contact with a structure to which the force sensor under calibration is disposed; providing electrical power to the electrical conductor, the electrical power comprising a time-varying amplitude; reciprocating the armature at the reciprocation velocity in response to providing electrical power to the electrical conductor; providing the dynamic force to the structure; measuring the alternating voltage; determining the alternating current through the electrical conductor; determining the reciprocation velocity of the armature; determining the dynamic force from the reciprocation velocity, the alternating voltage, and the alternating current; and determining a calibration response for the force sensor to calibrate the force sensor to be traceable to the SI, wherein the reciprocation velocity, the alternating voltage, and the alternating current are traceable to the SI.

* * * * *